US011443046B2

(12) United States Patent
Abraham et al.

(10) Patent No.: US 11,443,046 B2
(45) Date of Patent: Sep. 13, 2022

(54) ENTRY POINT FINDER

(71) Applicant: Onapsis, Inc., Boston, MA (US)

(72) Inventors: Sergio Javier Abraham, Ciudad Autónoma de Buenos Aires (AR); Pablo Agustin Artuso, Olivos (AR); Alejandro Gabriel Burzyn, Ciudad Autónoma de Buenos aires (AR)

(73) Assignee: Onapsis, Inc., Boston, MA (US)

( * ) Notice: Subject to any disclaimer, the term of this patent is extended or adjusted under 35 U.S.C. 154(b) by 210 days.

(21) Appl. No.: 15/676,044

(22) Filed: Aug. 14, 2017

(65) Prior Publication Data

US 2019/0050579 A1 Feb. 14, 2019

(51) Int. Cl.
*G06F 21/60* (2013.01)
*G06F 16/23* (2019.01)
(Continued)

(52) U.S. Cl.
CPC .............. *G06F 21/60* (2013.01); *G06F 16/23* (2019.01); *G06F 16/33* (2019.01); *G06F 16/34* (2019.01);
(Continued)

(58) Field of Classification Search
CPC .......... G06F 21/60; G06F 16/33; G06F 16/23; G06F 16/34; G06F 21/563; G06F 21/577; G06F 21/57; H04L 63/1433
See application file for complete search history.

(56) References Cited

U.S. PATENT DOCUMENTS 5,969,484 A 10/1999 Santi et al.
6,282,698 B1 * 8/2001 Baker ..................... G06F 8/75
717/118

(Continued)

FOREIGN PATENT DOCUMENTS

CN 105045155 11/2015
WO 2012001667 1/2012
WO WO2013055501 4/2013

OTHER PUBLICATIONS

G. A. Di Lucca, A. R. Fasolino, M. Mastoianni and P. Tramontana, "Identifying cross site scripting vulnerabilities in Web applications," Proceedings. Sixth IEEE International Workshop on Web Site Evolution, Chicago, IL, USA, 2004, pp. 71-80. (Year: 2004).*

(Continued)

*Primary Examiner* — Jung W Kim
*Assistant Examiner* — Sameera Wickramasuriya
(74) *Attorney, Agent, or Firm* — Crowell & Moring LLP

(57) ABSTRACT

A computer-based method of analyzing a business-critical application computer system includes extracting a plurality of software objects from the business-critical application computer system, storing the extracted software objects in a computer-based search platform, finding relationships between the extracted software objects that are stored in the computer-based search platform, and creating a database that represents the extracted software objects and the relationships between the extracted software objects. Each software object (a unique piece of code, a file, a data string, or other aspect of the business-critical application computer system) may represent an element of the business-critical application computer system whose graphical representation as a node connected to another node based on relationships, functional or otherwise, between the corresponding elements is desirable in view of a particular goal of the analysis.

18 Claims, 22 Drawing Sheets

(51) Int. Cl.
*G06F 16/33* (2019.01)
*G06F 16/34* (2019.01)
*G06F 21/56* (2013.01)
*G06F 21/57* (2013.01)
*H04L 9/40* (2022.01)

(52) U.S. Cl.
CPC .......... *G06F 21/563* (2013.01); *G06F 21/577* (2013.01); *H04L 63/1433* (2013.01)

(56) References Cited

U.S. PATENT DOCUMENTS

| | | | |
|---|---|---|---|
| 6,781,422 | B1 | 6/2004 | Yang |
| 7,207,065 | B2 | 4/2007 | Chess et al. |
| 7,614,046 | B2 | 11/2009 | Daniels et al. |
| 7,865,931 | B1 | 1/2011 | Stone |
| 8,073,777 | B2 | 12/2011 | Barry et al. |
| 8,230,484 | B1 | 7/2012 | Wiese |
| 8,233,297 | B2 | 7/2012 | Kim |
| 8,359,655 | B1* | 1/2013 | Pham .............. G06F 21/12 370/486 |
| 8,555,385 | B1* | 10/2013 | Bhatkar ............ G06F 21/556 726/22 |
| 8,635,204 | B1* | 1/2014 | Xie .................. G06F 8/74 707/709 |
| 8,768,838 | B1 | 7/2014 | Hoffman |
| 8,776,239 | B2* | 7/2014 | De Keukelaere ..... G06F 11/00 713/188 |
| 8,931,055 | B2 | 1/2015 | Shea et al. |
| 8,966,639 | B1* | 2/2015 | Roytman .......... H04L 63/1433 726/22 |
| 9,015,847 | B1 | 4/2015 | Kaplan et al. |
| 9,118,713 | B2* | 8/2015 | Bisht ................ G06F 21/53 |
| 9,176,729 | B2* | 11/2015 | Mockus ............... G06F 8/70 |
| 9,544,327 | B1* | 1/2017 | Sharma .......... H04L 63/1433 |
| 9,965,633 | B2* | 5/2018 | Brucker ............. G06F 21/577 |
| 10,242,206 | B2 | 3/2019 | Abraham et al. |
| 10,348,756 | B2* | 7/2019 | Oberheide ........ H04L 63/1433 |
| 2005/0104473 | A1 | 5/2005 | Yoshida |
| 2008/0082374 | A1 | 4/2008 | Kennis et al. |
| 2008/0201760 | A1 | 8/2008 | Paolina et al. |
| 2008/0281860 | A1* | 11/2008 | Elias ............... G06Q 10/10 |
| 2009/0251925 | A1 | 10/2009 | Usui et al. |
| 2010/0020825 | A1* | 1/2010 | Bass ................. H04L 69/04 370/477 |
| 2010/0052963 | A1 | 3/2010 | Soude et al. |
| 2011/0261599 | A1 | 10/2011 | Duerbaum et al. |
| 2012/0019217 | A1 | 1/2012 | Jenni et al. |
| 2012/0063184 | A1 | 3/2012 | Mazumder |
| 2012/0081233 | A1 | 4/2012 | Garrity |
| 2012/0268969 | A1 | 10/2012 | Cuk |
| 2013/0024942 | A1* | 1/2013 | Wiegenstein ...... G06F 11/3604 726/25 |
| 2014/0009981 | A1 | 1/2014 | Knill |
| 2014/0165204 | A1 | 6/2014 | Williams et al. |
| 2014/0166856 | A1 | 6/2014 | Kato et al. |
| 2015/0015072 | A1 | 1/2015 | Deboy et al. |
| 2015/0041104 | A1 | 2/2015 | De Bock et al. |
| 2015/0137793 | A1 | 5/2015 | Englund et al. |
| 2015/0213268 | A1* | 7/2015 | Nance ............... G06F 21/577 726/1 |
| 2015/0227746 | A1 | 8/2015 | Chen et al. |
| 2015/0319185 | A1* | 11/2015 | Kirti ................ H04L 67/306 726/23 |
| 2015/0340952 | A1 | 11/2015 | Manchar |
| 2015/0347163 | A1* | 12/2015 | Tibble ................ G06F 8/54 717/152 |
| 2016/0119373 | A1 | 4/2016 | Fausto et al. |
| 2016/0147848 | A1* | 5/2016 | Krishnan ............ G06F 16/34 707/722 |
| 2016/0188885 | A1 | 6/2016 | Lee et al. |
| 2016/0335366 | A1* | 11/2016 | Zhang ............. H04L 63/1433 |
| 2017/0060961 | A1* | 3/2017 | Lanier ............. G06F 16/24575 |
| 2017/0206360 | A1 | 7/2017 | Brucker et al. |
| 2017/0286692 | A1* | 10/2017 | Nakajima ........... G06F 21/57 |
| 2018/0115246 | A1 | 4/2018 | Azrai |
| 2018/0198814 | A1* | 7/2018 | Brodie .............. G06F 21/57 |
| 2019/0163919 | A1 | 5/2019 | Holz et al. |

OTHER PUBLICATIONS

F. Yamaguchi, N. Golde, D. Arp and K. Rieck, "Modeling and Discovering Vulnerabilities with Code Property Graphs," 2014 IEEE Symposium on Security and Privacy, Berkeley, CA, USA, 2014, pp. 590-604, doi: 10.1109/SP.2014.44. (Year: 2014).*
L. P. Swiler, C. Phillips, D. Ellis and S. Chakerian, "Computer-attack graph generation tool," Proceedings DARPA Information Survivability Conference and Exposition II. DISCEX'01, 2001, pp. 307-321 vol. 2, doi: 10.1109/DISCEX.2001.932182. (Year: 2001).*
Krsul, Ivan. "Computer Vulnerability Analysis: Thesis Proposal." Department of Computer Sciences, Purdue University (1997). (Year: 1997).*
Fabian Yamaguchi, et al, "Modeling and Discovering Vulnerabilities with Code Property Graphs", Security and Privacy (SP), 2014 IEEE Symposium on, IEEE, 2014.
David Brumley, James Newsome, Dawn Song: Theory and Techniques for Automatic Generation of Vulnerability-Based Signatures; Feb. 2006.
European Search Report for EP18188868.6; dated Oct. 30, 2018.
European Search Report for 18188861.1 dated Oct. 26, 2018.
Younis et al, Assessing Vulnerability exploitability risk using software properties: Software Quality Journal; Chapman and Hall London GB, vol. 24, No. 1, Mar. 27, 2015: Springer Science & Business Media New York 2015.
European Search Report for 18188855.3, dated Nov. 9, 2018.
Brenneman and McCabe Software; "Improving Software Security by Identifying and Securing Paths Linking Attach Surfaces to Attack Targets", Sep. 20, 2011.
Muniah, et al; Beyond the Attack Surface; Software Protection, ACM, Oct. 28, 2016.
Anonymous; Elasticsearch—Wikipedia, Aug. 9, 2017.
European search report for 18188858.7, dated Oct. 26, 2018.
Wang Hayou et al; "Reevaluating Android Permission Gaps with Static and Dynamic Analysis" 2015 IEEE Global Communications Conference, Dec. 6, 2015.

* cited by examiner

ENTRY POINT FINDER

FIELD OF THE INVENTION

This disclosure relates to computer-based security and, more particularly, to a computer-based entry point finder (EPF) and associated computer-implemented techniques.

BACKGROUND

Security is of critical importance to modern companies, particularly for companies that have large, sophisticated computer systems such as enterprise resource planning (ERP) software applications and/or other business-critical software applications.

These computer systems can, of course, be or become susceptible to various vulnerabilities. Generally speaking, a vulnerability can be considered to be a flaw in a computer system that might allow an attacker somehow to compromise the computer system. The consequences of such compromises can be severe, and can impact, for example, confidentiality, integrity, and/or availability of the attacked computer system or aspects thereof. Computer system vulnerabilities can be exploited, for example, by executable programs, simple sets of commands or instructions, etc. Once an exploit is available for a particular vulnerability, any computer system that has that particular vulnerability may be under threat.

From time to time, companies that produce ERP and other business-critical software applications (also referred to as business-critical applications), for example, release patches to correct various flaws in those computer systems. Sometimes, implementing a patch can create new vulnerabilities that may be difficult to predict or identify, and, therefore, even more difficult to address.

As used herein, a "business-critical application" (BCA) generally refers to a crucial application to keeping a business running. These types of applications can vary from small tools to company-wide systems. These applications can work on clients' services, be provided by third parties, or can be developed internally. Generally speaking, BCAs are critical applications, where if interrupted, the interruption could result in financial losses, legal loses, negative publicity for the company, unhappy employees or customers, etc. A BCA may be totally different in different companies or different industries; depending on which systems(s) could cause significant damage to a company if problems occur.

Managing system security and identifying/assessing vulnerabilities should be an important part of every company's IT risk management policy, even though it can be quite challenging, particularly for computer systems that experience a great deal of change over time.

SUMMARY OF THE INVENTION

A system, referred to herein as an "entry point finder" ("EPF")—and associated techniques—is disclosed that may, in certain implementations, produce a representation that might be graphical in nature of software objects in a business-critical application computer system and the relationships, functional or otherwise, between those software objects. In a typical implementation, this may facilitate, for example, identifying possible entry points that an attacker might use to compromise a business-critical application computer system, such as an enterprise resource planning (ERP) system.

At a high level, an entry point may be considered a software object or relationship in a business-critical application computer system that serves as a point (e.g., an initial point) in a particular set of relationships among software objects within the business-critical application computer system. In some implementations, an entry point may be a software object abstraction that can be executed by an end-user of the system. In a typical implementation, there may be many types of software objects loaded into an EPF, but only some of them are entry points (e.g., that can be executed by an end-user of the system). Moreover, in some implementations, the end-user may define or may have defined, at least in part, which of the loaded software objects is an entry point.

In this regard, in a typical implementation, the EPF is configured to perform a computer-based method of analyzing a target business-critical application computer system to find relationships among software objects in (associated with) the target business-critical application computer system. This method includes, for example, extracting software objects from the business-critical application computer system, storing the extracted software objects in a search platform, finding relationships among the software objects, and creating a database (e.g., a graph-style database) to facilitate visualization and easy analysis of the software objects and their respective relationships. In a typical implementation, some of the software objects that get extracted from the computer system have associated source code; however, some of the software objects that get extracted from the computer system do not have associated source code.

In a typical implementation, the software objects generally are or represent elements of the target business-critical application computer system whose graphical representation as nodes connected to one another based on relationships, functional or otherwise, between the corresponding elements is desirable in view of a particular goal of the analysis. Each respective one of the elements of the target business-critical application computer system may be a unique piece of code, a file, a data string, or other aspect of the target business-critical application computer system.

The method may also include producing a graphical display that represents: each respective software object as a single node, and one or more relationships between the software objects by one or more connectors (e.g., lines) between the nodes that correspond to the related software objects.

In some implementations, extracting the software objects that include source code may involve: querying the target computer system for names of packages (groups of software objects) associated with the target business-critical application computer system, receiving a list of package names associated with the target business-critical application computer system in response to the query, and storing the list of package names in a first queue. In such implementations, extracting the software objects that include the source code may further involve selecting one package name from the first queue, and extracting (with a particular one of a plurality of extractors) the source code associated with the selected package name from the business-critical application computer system. The method may further include saving a compressed version of the extracted source code at a first computer-based memory location, and pushing (or sending) the location of the stored compressed version of the extracted source code to a second queue. The method may further include saving a decompressed version of the extracted source code at a second computer-based memory location; and pushing (or sending) the location of the stored decompressed version of the extracted source code to a third queue.

In some implementations, extracting the software objects that do not include source code may involve: pushing (or sending) the software objects that do not include source code to queues, each of which is for a particular type of software object that does not include source code.

In some implementations, storing the extracted software objects in a computer-based search platform may include reading, with one or more search platform uploaders, source code from a computer-based memory storage (based on the location information in a queue), reading, with the one or more search platform uploaders, non-source code-based software objects from one or more object queues, and storing what the one or more search platform uploaders read into the search platform with an intelligent structure.

In some implementations, finding the relationships between the extracted software objects that are stored in the computer-based search platform includes: for software objects that have source code—reading each statement of the source code; and determining whether any statements in the source code define a relationship between any of the software objects, and for software objects that do not have source code—executing one or more queries regarding possible relationships between any of the software objects.

Creating a database that represents the extracted software objects and the relationships between the extracted software objects may include creating a graph (or graph-style) database to facilitate query and visualization of the software objects of the business-critical application computer system and their respective relationships to one another. The graph or graph-style database may define nodes and connections between nodes respectively representing software objects from the business-critical application computer system and relationships between software objects.

In another aspect, an entry point finder (EPF) includes a plurality of worker modules, a plurality of queues (where each one of the queues is communicatively coupled to a corresponding one or more of the worker modules), a plurality of computer-based memory storage locations (where each one of the computer-based memory storage locations is communicatively coupled to a corresponding one or more of the worker modules), and a computer-based search platform (communicatively coupled to at least one of the worker modules).

In a typical implementation, the entry point finder is configured to extract, with one or more of the worker modules, a plurality of software objects from a business-critical application computer system; store the extracted software objects in the computer-based search platform; find relationships, with one or more of the worker modules, between the extracted software objects that are stored in the computer-based search platform; and create a database that represents the extracted objects and the relationships between the extracted software objects.

There are a variety of ways that the EPF and the output it produces can be advantageously utilized to help improve and manage security in the associated business-critical application computer system. These include, for example, automatically detecting the impact of a particular patch after implementation, automatically detecting unnecessary accesses/privileges among company employees, and/or facilitating the automatic generation of vulnerability detection rules based on vulnerability primitives. Each of these is summarized, in turn, below.

Impact Detection after Patch Implementation

A computer-based method is disclosed for assessing impact of a patch on a target business-critical application computer system. The method includes: receiving information at a computer-based impact assessment system about end-user activities on the target computer system over a specified period of time; identifying, with a computer-based fixed objects identifier, one or more software objects in the target computer system fixed by the patch; identifying, with a computer-based entry point finder, one or more entry points associated with the fixed software object(s) at the target system; and cross-referencing the information about the end-user activities on the target system against the one or more entry points associated with the fixed software object(s) at the target system.

In some implementations, the cross-referencing identifies which of the entry points associated with the fixed software object(s) also have been used by end-users of the target system during the specified time period. Moreover, in some implementations, the cross-referencing identifies: 1) a list of functions impacted by one or more associated vulnerabilities and that need to (or that should) be tested after the patch is implemented, and/or 2) a list of end users that are actually using the impacted functions and which processes the listed end users are actually involved in.

In some implementations, the computer-based method includes prompting or enabling a user to specify the period of time via a computer-based user interface terminal.

The information about the end-user activities can include, for example, information about transactions started, reports started, successful function calls, and HTTP requests through a web browser. Moreover, in some implementations, the information about the transactions started, the reports started, and the successful function calls may be obtained from a security audit log for the target computer system, and the information about the HTTP requests may be obtained from an HTTP access log for the target computer system.

The computer-based fixed objects identifier may be configured to access information about patches for the target computer system from a computer-based database coupled to the computer-based fixed objects identifier and/or from a missing patches detector.

The computer-based entry point finder may include, for example, a plurality of worker modules, a plurality of queues (where each one of the queues is communicatively coupled to a corresponding one or more of the worker modules), a plurality of computer-based memory storage locations (where each one of the computer-based memory storage locations is communicatively coupled to a corresponding one or more of the worker modules), and a computer-based search platform communicatively coupled to at least one of the worker modules. In such implementations, the computer-based method may further include: extracting, with one or more of the worker modules, a plurality of software objects from a computer system, storing the extracted software objects in the computer-based search platform, finding relationships (with one or more of the worker modules) between the extracted software objects that are stored in the computer-based search platform, and creating a database that represents the extracted software objects and the relationships between the extracted software objects.

In yet another aspect, a computer-based impact assessment system is disclosed for assessing impact of a patch on a target computer system. The computer-based impact assessment system may include, for example, a user activity extractor for extracting information from the target computer system about end-user activities on the target computer system over a specified period of time, a computer-based fixed objects identifier for identifying one or more software objects in the target computer system fixed by the patch, a computer-based entry point finder for identifying one or more entry points associated with the fixed software object(s) at the target system, and a computer-based processor for cross-referencing the information about the end-user activities on the target system against the one or more entry points associated with the fixed software object(s) at the target system.

Checking for Unnecessary Privileges

A computer-based method is disclosed for checking a target computer system for unnecessary privileges. The method includes: receiving, at a computer-based privileges checking system, a listing of all privileges assigned to users in the target computer system; receiving, at the computer-based privileges checking system, information about end-user activities on the target computer system over a specified period of time; for each respective one of the end-user activities, querying a computer-based entry point finder for any privileges that were checked at the target system for that activity; and removing the privileges that were checked at the target system for the end-user activities from the listing of all assigned privilege at the target system to produce a listing of unnecessary privileges at the target system. In a typical implementation, the computer-based method further includes eliminating the unnecessary privileges at the target system.

Certain implementations include prompting or enabling a user to specify the period of time via a computer-based user interface terminal.

The information about the end-user activities may include, for example, information about transactions started, reports started, successful function calls, and HTTP requests through a web browser. The information about the transactions started, the reports started, and the successful function calls may be obtained, for example, from a security audit log for the target system. The information about the HTTP requests may be obtained, for example, from an HTTP access log for the target system.

In some implementations, the computer-based method may include extracting, with one or more worker modules of the entry point finder, a plurality of software objects from the target computer system; storing the extracted software objects in a computer-based search platform; finding relationships, with one or more of the worker modules of the entry point finder, between the extracted software objects that are stored in the computer-based search platform; and creating a database that represents the extracted software objects and the relationships between the extracted software objects. The database may be a graphical (or graph-style) database that represents each extracted software object as a node and each relationship between the extracted software objects as a connector between the nodes. Some of the nodes may represent user activities, wherein some of the nodes may represent privilege checks for the user activities, and each respective one of the privilege check nodes may be connected to a corresponding one of the user activity nodes.

In yet another aspect, a computer-based system is disclosed for identifying unnecessary privileges on a target computer system. The computer-based system includes: a privileges extractor to extract a listing of all assigned privileges at the target computer system; a user activity extractor to extract information about end-user activities on the target computer system over a specified period of time; a computer-based entry point finder to identify, for each respective one of the extracted end-user activities, any privileges that were checked at the target system for that activity; and a computer-based calculator to remove the privileges that were checked at the target system for the extracted end-user activities during the specified period of time from the listing of all privileges assigned at the target system to produce a listing of unnecessary privileges at the target system.

Generating Rules for Detecting Security Vulnerabilities Based on Vulnerability Primitives A computer-based method is disclosed for generating rules to detect security vulnerabilities in a target computer system based on vulnerability primitives. The method includes: running a computer-based entry point finder at the target computer system so that the entry point finder can access and extract information about source code that is actually installed at the target computer system; creating, with the computer-based entry point finder, a graph (or graphical-style) database that represents software objects extracted from the target computer system and relationships between the extracted software objects; identify a vulnerability primitive for a security vulnerability at the target computer system; and correlate the vulnerability primitive against information in the graphical-style database to help identify any relationships between a software object that is identified by the vulnerability primitive as being vulnerable and one or more other software objects in the target computer system.

In a typical implementation, the software object that is identified by the vulnerability primitive is vulnerable, but undetectable or difficult to detect, and the one or more other entry point software objects related to the vulnerability primitive software objects in the target computer system are easier to detect software objects in the target computer system.

Moreover, in a typical implementation, the security vulnerabilities are bugs or features of the target computer system that expose the target computer system to possible attack, or flaws in the target computer system's security, and the vulnerability primitive is a simple statement or indication that a particular software object is vulnerable.

The graph (or graphical-style) database may represent each extracted software object as a node and each relationship between the extracted software objects as a connector between nodes.

In some implementations, the computer-based method includes: extracting, with one or more worker modules of the entry point finder, a plurality of software objects from the target computer system; storing the extracted software objects in a computer-based search platform; finding relationships, with one or more of the worker modules of the entry point finder, between the extracted software objects that are stored in the computer-based search platform; and creating the graphical database based on the relationships found.

In certain implementations, the computer-based method includes: generating one or more detection rules for the security vulnerability represented by the vulnerability primitive based on the correlation. The detection rules may be rules used to detect attacks by an IDS/IPS/or any other security detection system. One or more of the detection rules may reference the one or more other software objects in the target computer system identified through the correlation. In some such implementations, the computer-based method may further include taking corrective measures to address the corresponding security vulnerability in response to one or more of the detection rules being satisfied.

In yet another aspect, a computer-based system is disclosed for generating rules to detect security vulnerabilities in a target computer system based on vulnerability primitives. The computer-based system may include: a computer-based entry point finder running at the target computer system and configured to create a graphical-style database that represents software objects from the target computer system and relationships between the extracted software objects based on source code actually installed on the target computer system; a knowledge base of vulnerability primitives defining one or more vulnerability primitives for security vulnerabilities at the target computer system; and an affected entry point finder configured to correlate each respective one of the vulnerability primitives against information in the graphical-style database to help identify any relationships between a software object that is identified by the vulnerability primitive and one or more other software objects in the target computer system.

In some implementations, one or more of the following advantages are present.

For example, the systems and techniques disclosed herein are particularly effective at analyzing computer systems (e.g., ones that include ABAP code for an SAP system) in order to find entry points (e.g., objects that can be executed by end-users) that, at some point, might be utilized to execute a vulnerable object (e.g., one fixed by a recent security patch). This type of analysis typically requires only a very small period of time, particularly compared to more traditional manual search techniques. This time and efficiency benefit is particularly noteworthy where the computer system at issue is a large one (e.g., where the ABAP code of an SAP system, for example, when extracted and decompressed to a separate location, might occupy at least, 30 GB or even 100 GB of plain text files containing the code).

Additionally, having a map of relationships (e.g., in a graph database), one can easily trace the path from a vulnerability to an entry point, for example. As an extra advantage: the size of the information can be incredibly reduced. For example, in some implementations, approximately 70 GB of source code can be reduced to approximately 30 MB of graphs information.

The EPF can be utilized or leveraged to help assess impact of a patch on a target computer system. This can facilitate efficient, yet robust, testing of a patched system to confirm that the system works as intended and that the patch did not introduce any new problems into the system. The EPF can be utilized or leveraged to help identify unnecessary (e.g., unused) privileges in a target computer system. Additionally, the EPF can be utilized or leveraged to detect security vulnerabilities in a target computer system based on vulnerability primitives.

Other features and advantages will be apparent from the description and drawings, and from the claims.

Figure 1:
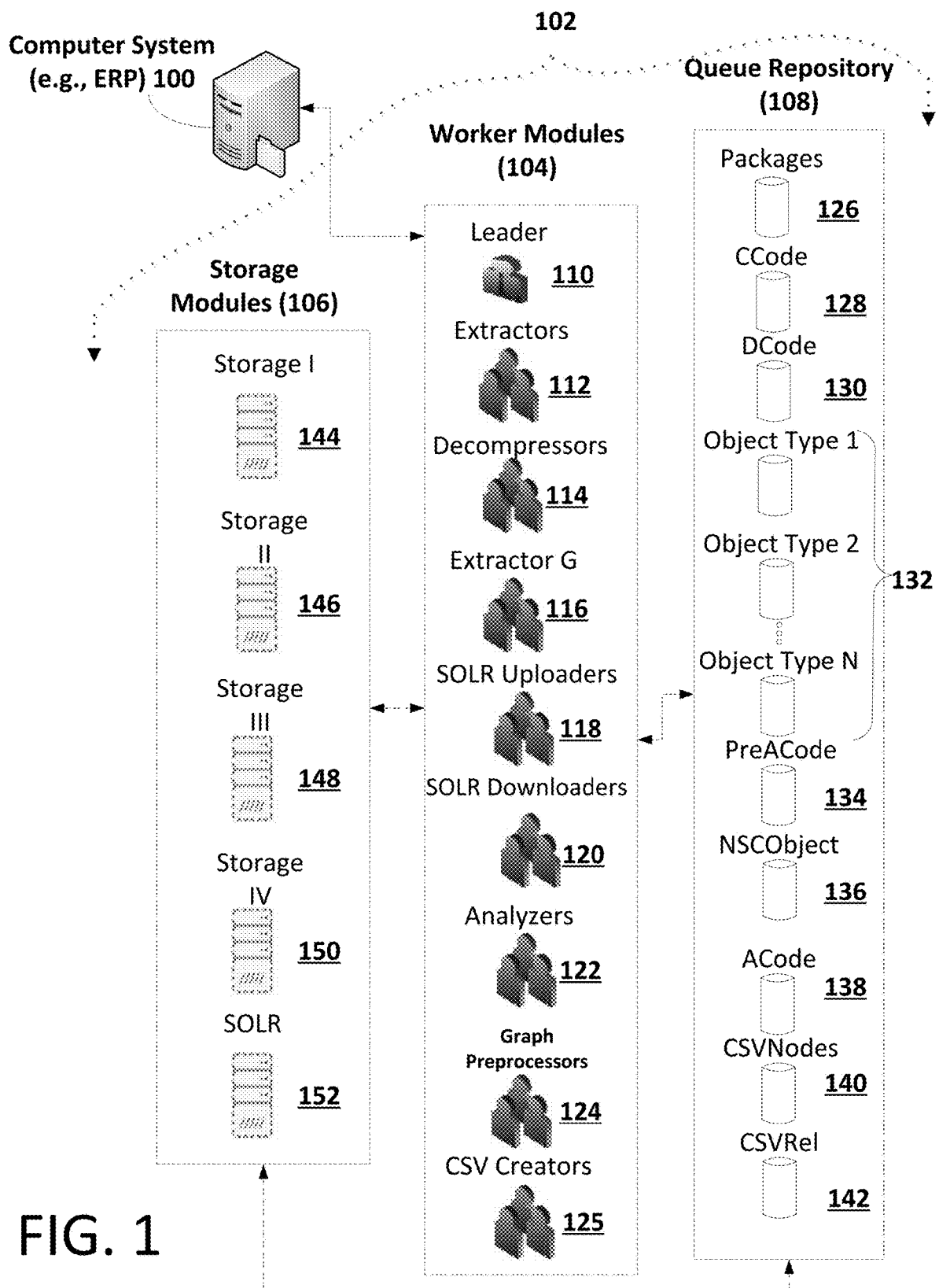
FIG. 1 is a schematic representation of a computer system with an exemplary computer-based entry point finder ("EPF").

Each one of FIGS. 8A-8H is a partial schematic representation of the computer system and/or EPF of FIG. 1 showing different interactions between various components thereof.

Figure 9:
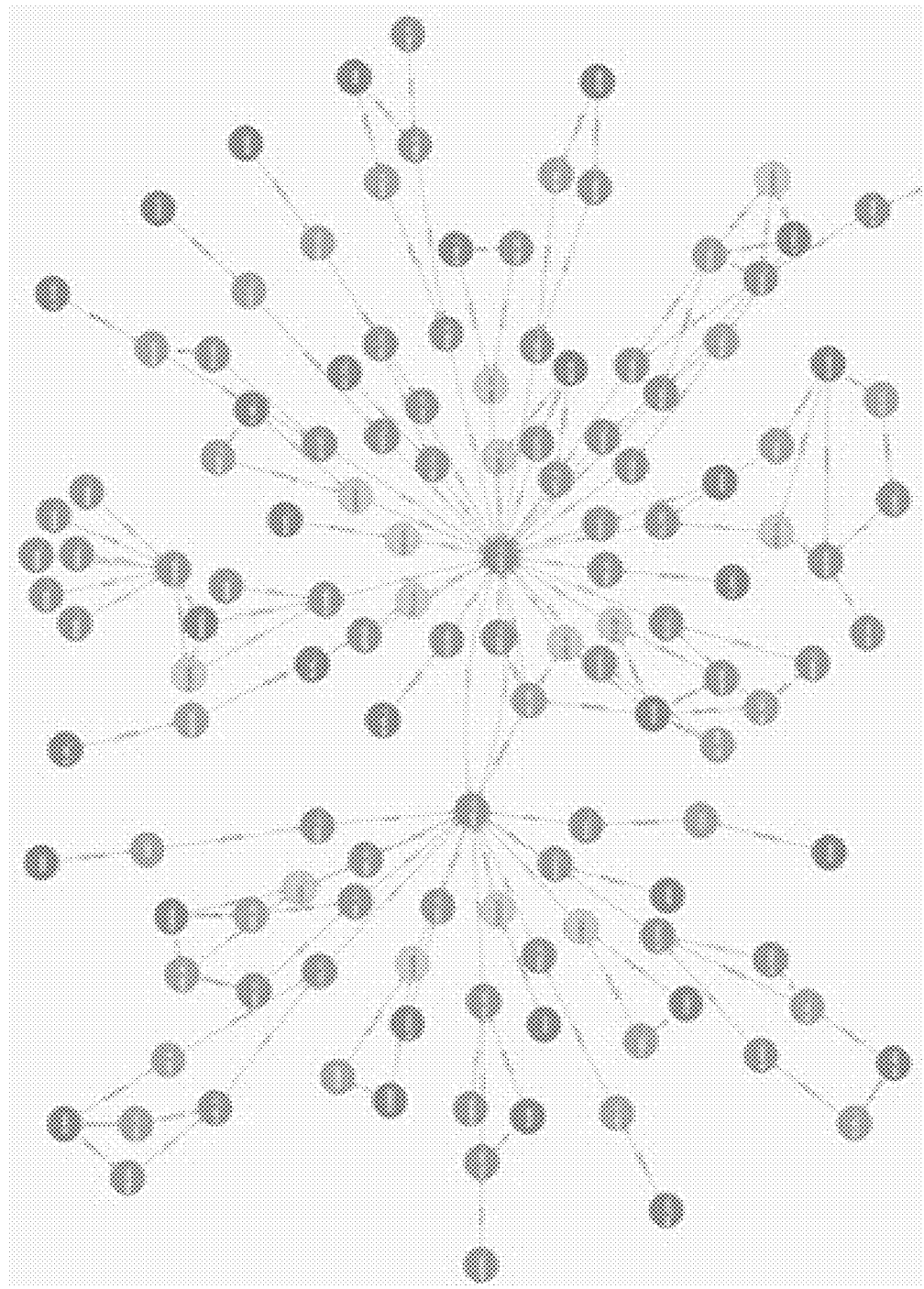

FIG. 9 is a schematic representation of an exemplary graph database with nodes and connectors that respectively represent objects and relationships between objects from the computer system of FIG. 1.

Figure 10:
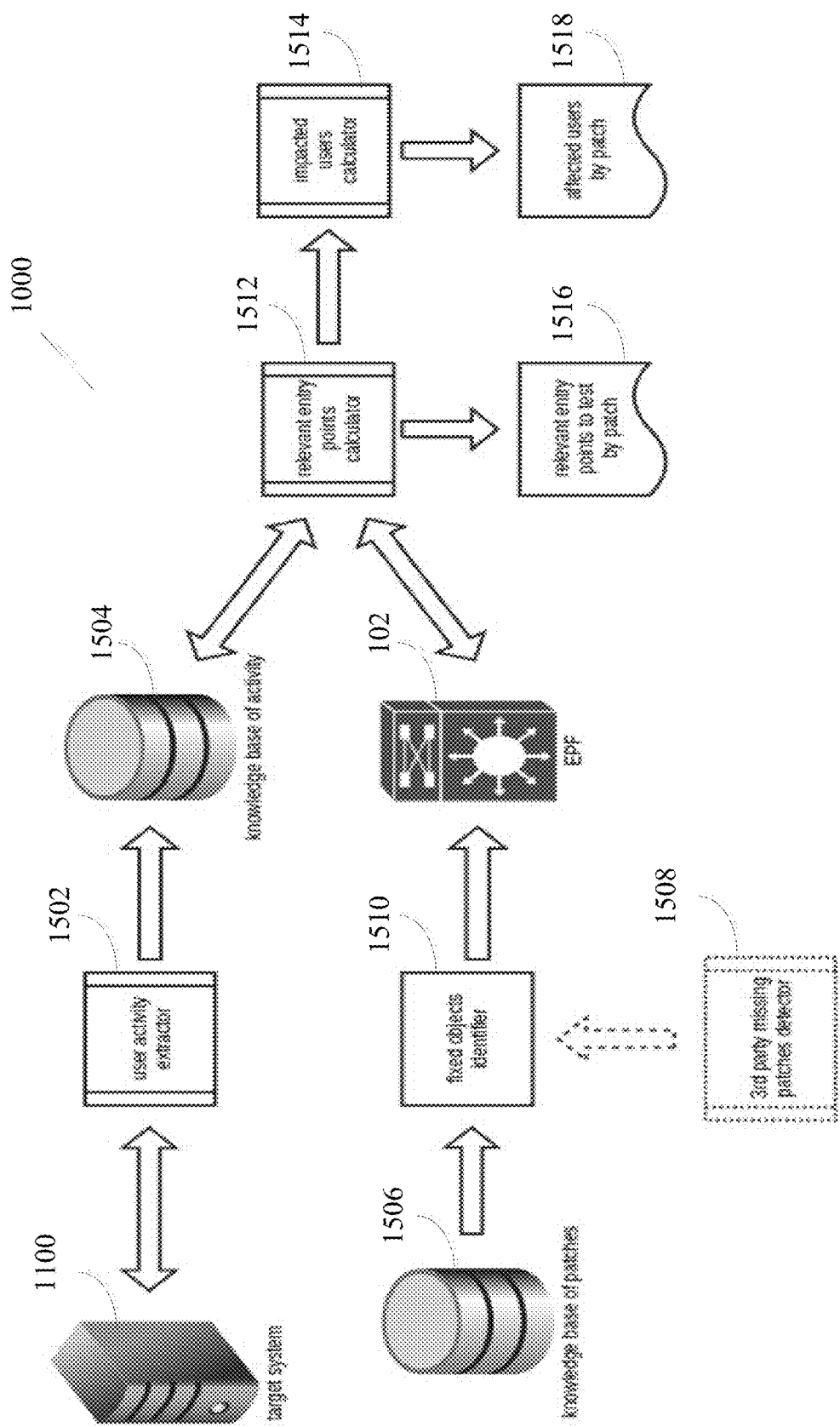

FIG. 10 is a schematic representation of an exemplary impact assessment system, in which an EPF is being applied to help automatically assess impact of a particular patch after being implemented on a target system.

Figure 11:
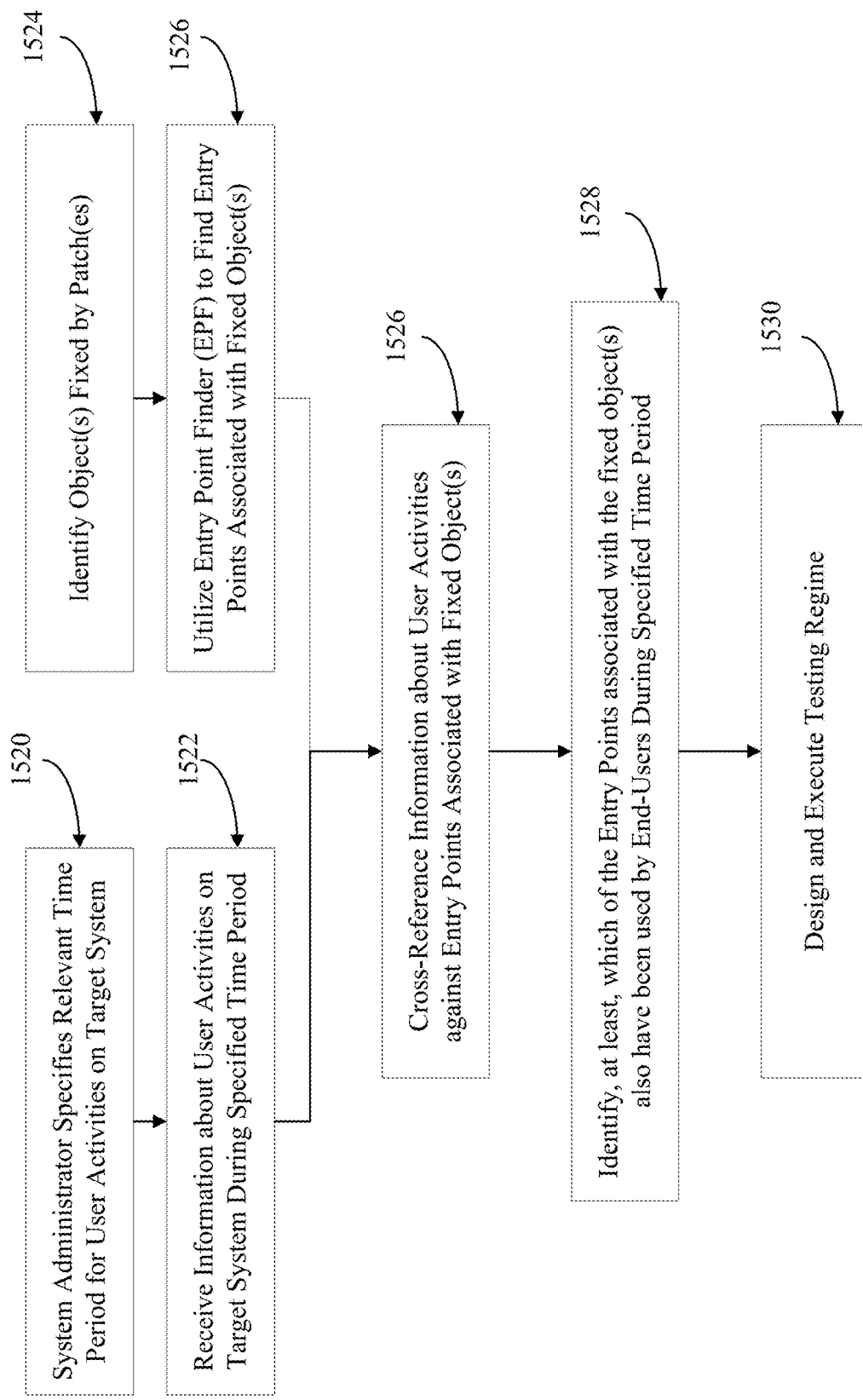

FIG. 11 is a flowchart of an exemplary process for assessing the impact of a patch on a target system.

Figure 12:
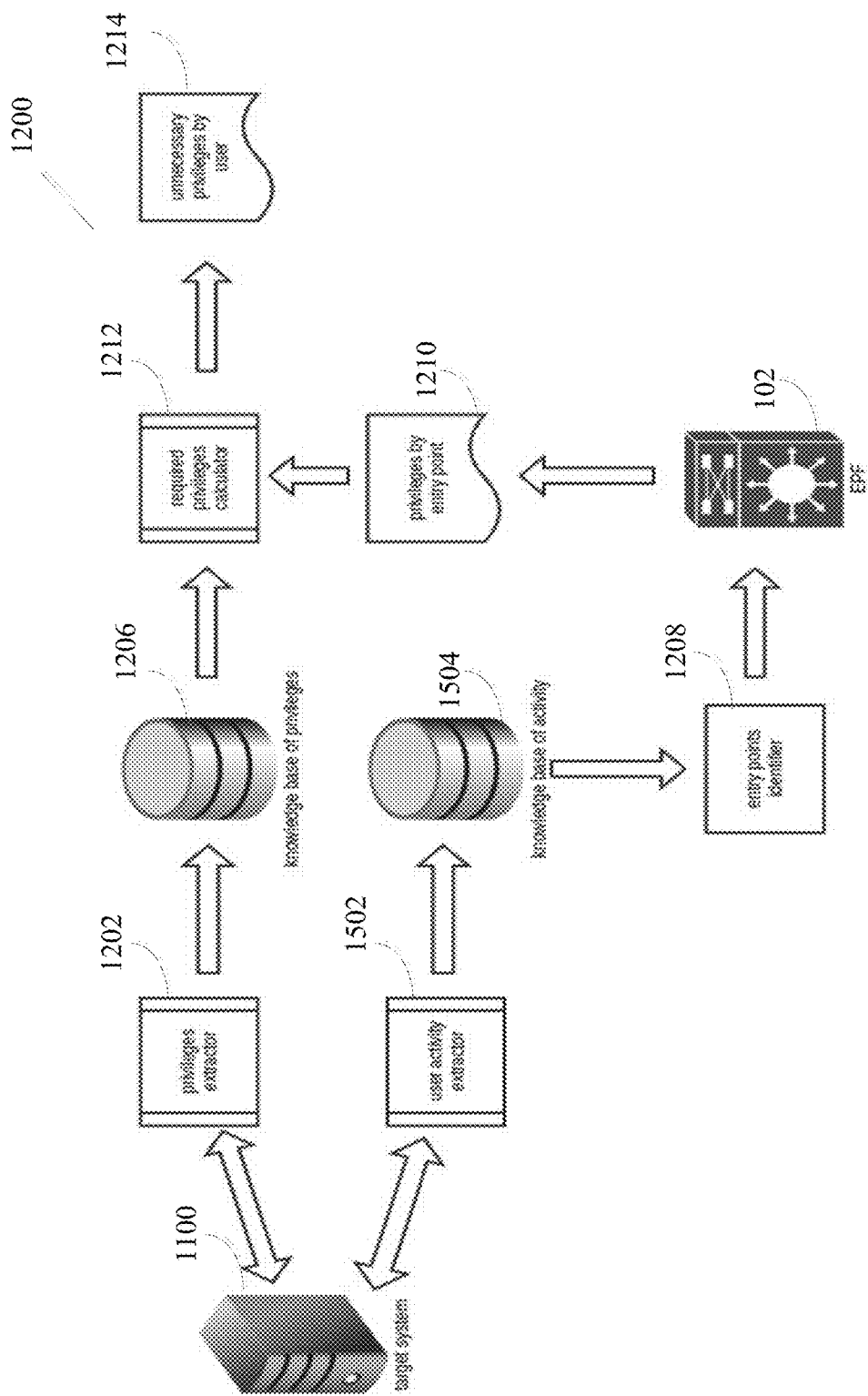

FIG. 12 is a schematic representation of an exemplary system, in which an EPF is being utilized, to facilitate automatic detection of unnecessary accesses/privileges in the computer system among company employees.

Figure 13:
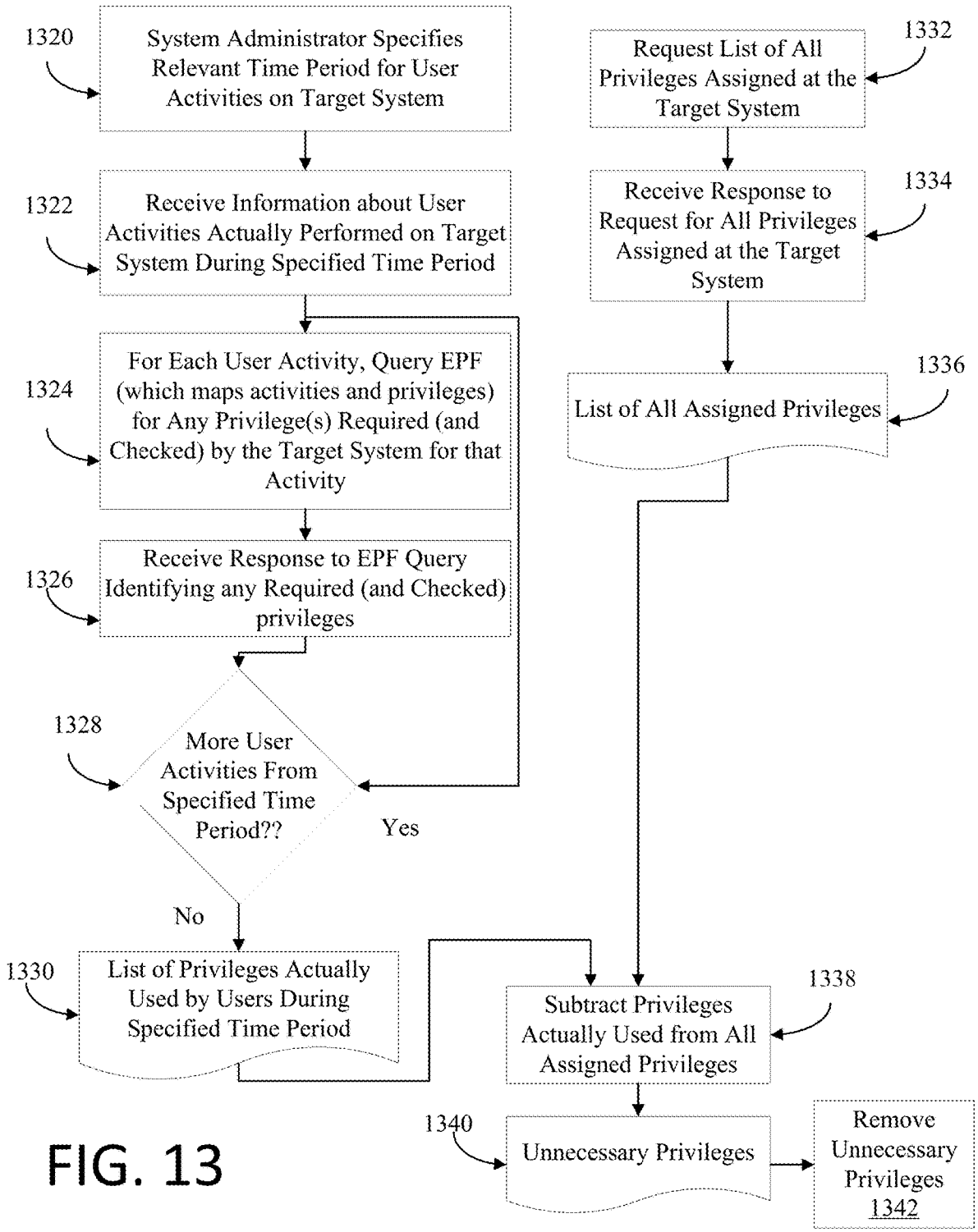

FIG. 13 is a flowchart of an exemplary process of automatically detecting unnecessary accesses/privileges in a computer system among company employees.

Figure 14:
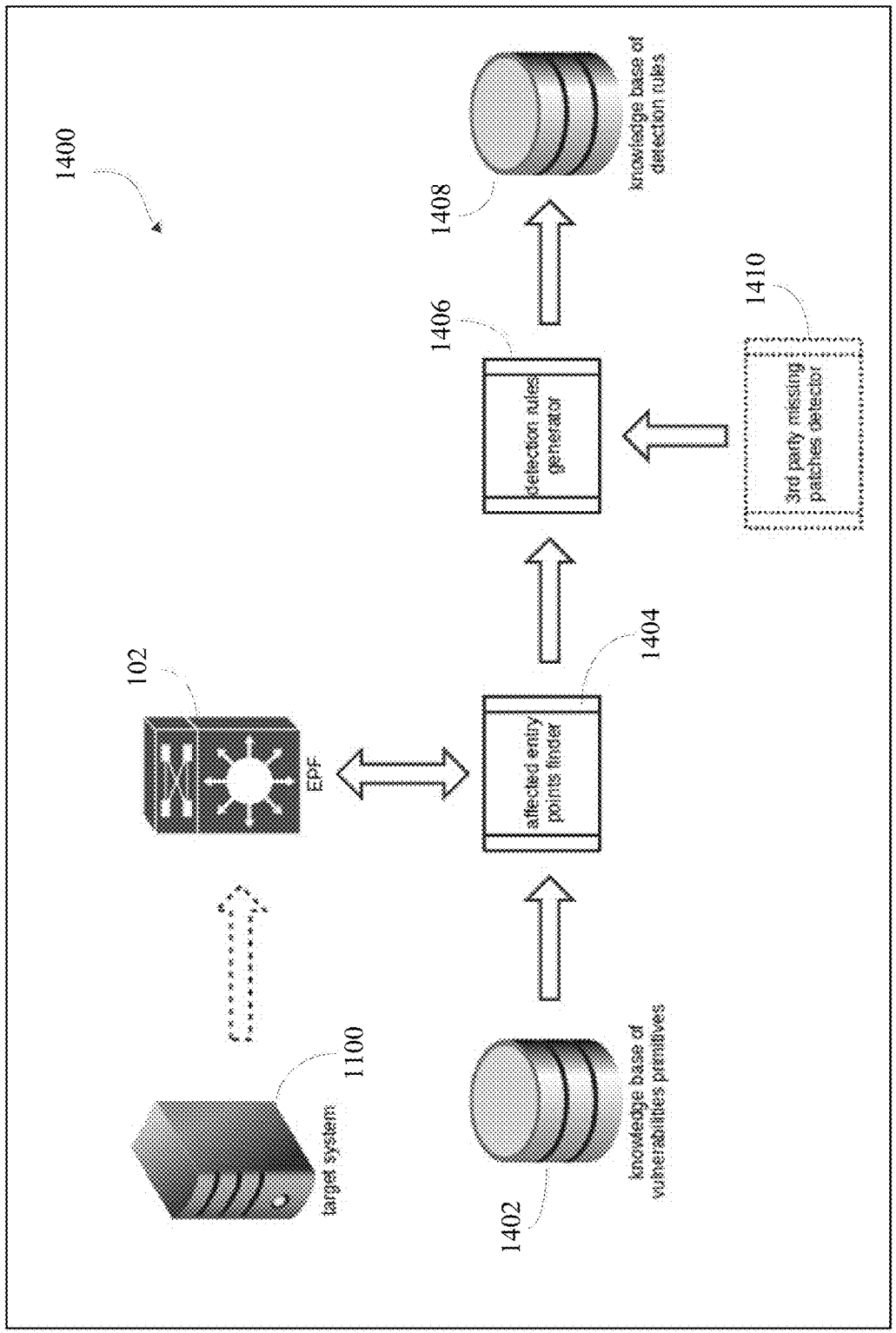

FIG. 14 is a schematic representation of an exemplary system, in which an EPF is being utilized, for generating detection rules for security vulnerabilities based on vulnerability primitives.

Figure 15:
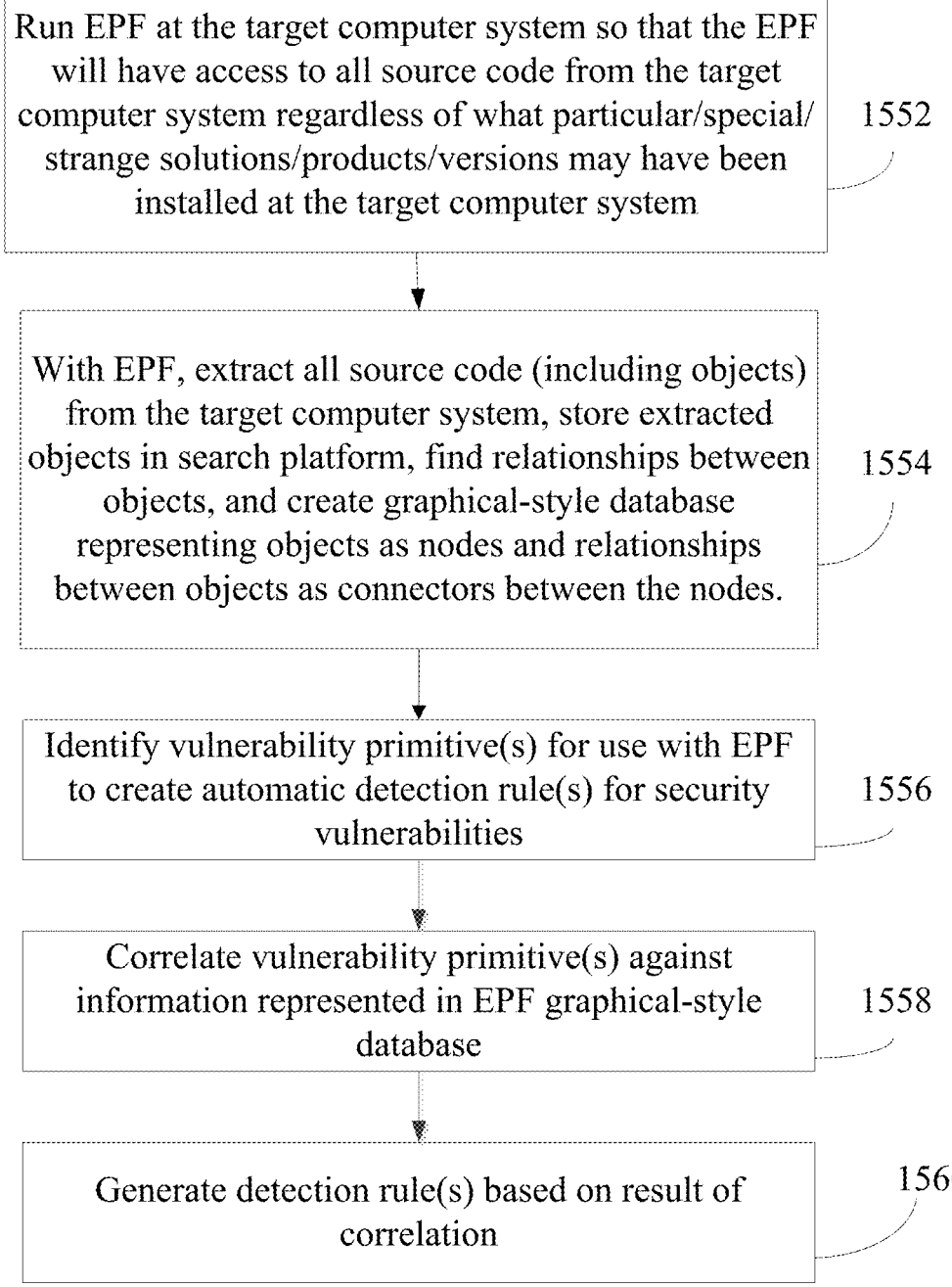

FIG. 15 is a flowchart of an exemplary process for generating detection rules for security vulnerabilities based on vulnerability primitives.

Like reference numerals refer to like elements.

DETAILED DESCRIPTION

A system, referred to herein as an "entry point finder" ("EPF"), and associated techniques are disclosed that may, in certain implementations, enable easy identification of possible entry points that an attacker might use to compromise a computer system, such as, for example, an enterprise resource planning (ERP) system.

In this regard, in a typical implementation, at a high level, the EPF extracts objects from the computer system, for example, from the source code, a file, a data string, etc., stores the extracted objects in a search platform, finds relationships among the objects, and creates a graph database to facilitate visualization and easy analysis and query of the objects and their respective relationships. There are a variety of ways that the EPF and its output can be advantageously utilized and leveraged to help understand an evolving computer system and to improve and help manage security in the computer system. For example, in some implementations, EPF and its output can be advantageously utilized and leveraged to help automatically detect unnecessary accesses/privileges among company employees, automatically detect and understand the impact of a particular patch after implementation, and/or facilitate the automatic generation of vulnerability detection rules based on vulnerability primitives.

FIG. 1 is a schematic representation of a computer system 100, in this case being an ERP system, and, coupled to that computer system, various components that collectively form an entry point finder (EPF) 102 for the ERP system 100.

According to the illustrated example, the EPF 102 has a plurality of worker modules 104, a plurality of storage modules 106, and a queue repository 108, with a plurality of queues. The ERP system 100 in the illustrated example interfaces with the EPF 102 via one or more of the worker modules 104, and the worker modules 104, queue repository 108, and storage modules 106 are communicatively coupled to each other as indicated.

The worker modules 104 in the illustrated implementation include multiple components, including, a leader 110, one or more extractors 112, one or more decompressors 114, one or more extractor Gs 116, one or more SOLR uploaders 118, one or more SOLR downloaders 120, one or more analyzers 122, one or more graph preprocessors 124 and one or more CSV Creators 125. Of course, SOLR is just one possible database vendor. The scope of this application is not limited to utilizing SOLR technologies. It is also noted that all of these components are not required, but instead, are provided as a group for exemplary purposes.

The queue repository 108 in the illustrated implementation includes multiple components, including, a packages queue 126, a CCode queue 128, a DCode queue 130, Object Type queues 132 (Type 1, Type 2, . . . Type N), a PreACode queue 134, an NSCObject queue 136, an ACode queue 138, a CSVNodes queue 140, and a CSVRel queue 142. It is also noted that all of these components are not required, but instead, are provided as a group for exemplary purposes.

The storage modules 106 includes multiple component, including: a first storage module (Storage I) 144, a second storage module (Storage II) 146, a third storage module (Storage III) 148, a fourth storage module (Storage IV) 150, and a search platform 152 (SOLR). It is also noted that all of these components are not required, but instead, are provided as a group for exemplary purposes.

A typical EPF 102 also would include or be connected to one or more computer-based user interface terminals (not shown in FIG. 1) that enable users to access, leverage, and interact with the EPF 102 and its associated output.

The computer system 100 (and the other computer systems or the like referred to herein) can be virtually any kind of computer system. In various implementations, the computer system 100 may be or include one or more computer-based real-time applications (RTAs). Examples of such RTAs include, but are not limited to, web servers, application servers, database servers, operating systems and/or business critical applications (BCAs), among others. Examples of BCAs include, but are not limited to, Enterprise Resource Planning (ERP), Customer Relationship Management (CRM), Supplier Relationship Management (SRM), Supply Chain Management (SCM), Product Life-cycle Management (PLM), Human Capital Management (HCM), Integration Platforms, Business Warehouse (BW)/Business Intelligence (BI) and Integration applications developed by SAP, Oracle, Microsoft, Siebel, J D Edwards, PeopleSoft, etc. For purposes of discussion and clarity, much of the discussion contained herein will assume that the computer system is a computer system provided by the SAP® company, such as an ERP or other type business-critical application software. It should be noted that a computer system containing a business-critical application is also referred to herein as a business-critical application computer system.

Figure 2:
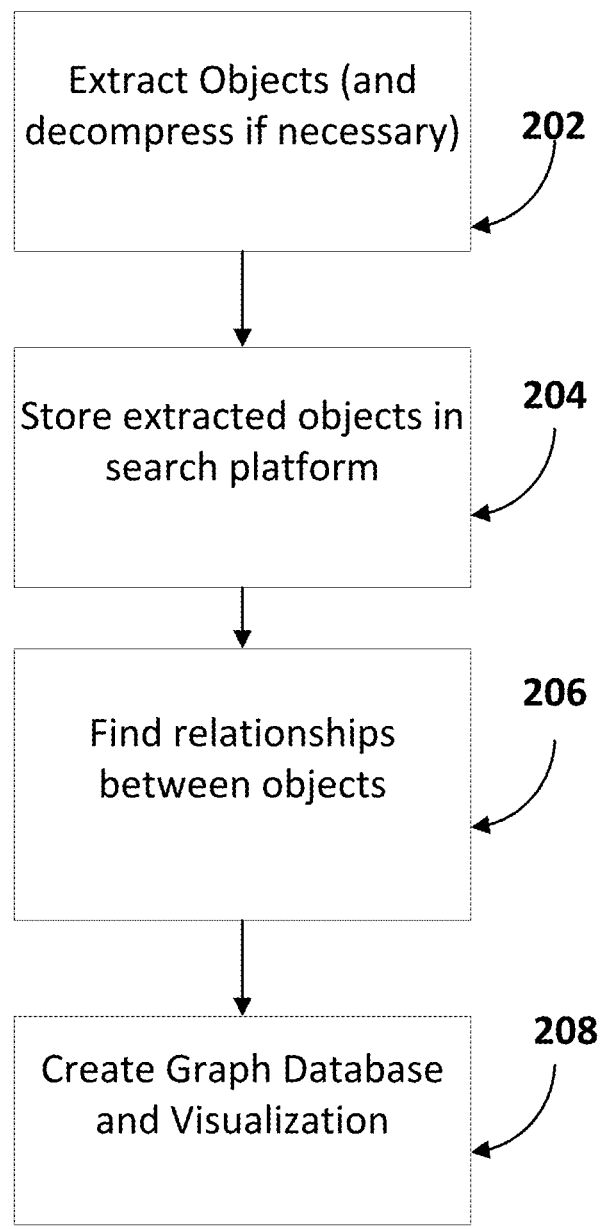
FIG. 2 is a flowchart showing an exemplary process performed by the EPF of FIG. 1 in the context of the overall computer system.

FIG. 2 is a flowchart that represents an exemplary high-level overview of a process that the exemplary EPF 102 of FIG. 1 might perform.

In this regard, the illustrated process has the EPF 102 (at 202) extracting software objects from the computer system, and decompressing, if necessary. More particularly, in a typical implementation, the leader module 110 extracts these software objects.

An object may be thought of as an element in a computer system (e.g., a piece of source code, a software file, or some other software aspect of which the computer system is comprised) whose graphical representation as a node among other nodes (each respective node representing a corresponding one of the objects), where the nodes are connected to one another based on relationships, functional or otherwise, between the corresponding objects, will be desirable given a particular end goal for the EPF analysis. Generally speaking, in many instances, an object does not relate to only a single line of code. Instead, an object would relate to a more abstract element represented by multiple lines of code or even a complete source code file. It should be noted that objects are also referred to as software objects, herein.

The specific aspects of the computer system that get treated as objects in this regard are generally context-dependent, which means that the overall goal of a particular EPF analysis (e.g., detection of unnecessary privileges, impact detection after patch implementation, etc.), and/or the specific configuration of the computer system being exposed to the EPF analysis, for example, may influence which specific aspects of the computer system end up being treated as objects and which do not.

In a typical implementation, some of the objects will have source code (i.e., will represent or include one or more lines of source code) from the computer system, but some of the other objects may not have source code. In a particular implementation, for example where the computer system at issue is a business-critical application from the SAP® company, the objects that have source code may include one or more of: reports, functions, modules, includes, subroutines, methods, etc. In those kinds of implementations, the objects that do not have source code may include one or more of: transaction codes, authorization objects, function groups, classes, tables, Internet Communication Framework (ICF) services, components, packages, etc.

Reports may be considered as programs that define a feature capable of being executed by an end-user. Functions may refer to sub-programs that contain sets of reusable statements with importing and exporting parameters that can be executed independently. Modules may refer to processing blocks (e.g., with routines and/or subroutines) in a program. Includes may refer to programs that act as repositories that allow the use of the same source code in different programs. Subroutines may refer to reusable sections of code that are modularization units within a program where one or more functions are encapsulated in the form of source code. Methods may include procedures that are executed when a message is received.

Transaction codes may be alphanumeric codes, for example, that can help guide a user to a screen for a particular task to be performed. Authorization objects may be composed of groupings of fields, where the values in these fields are used in authorization checks. Function groups may be a container for function modules. Classes may be abstract descriptions of objects. Tables may be arrays of information. ICF services may store web services offered by the computer system. Components may define the attributes of certain ABAP objects. Packages may help developers, for example, modularize, encapsulate and decouple units in the computer system.

Generally speaking, some computer systems (e.g., computer systems from the SAP® company) may organize their source code into packages, or the like. In general terms, packages (e.g., those available from the SAP® company) may be designed to help developers modularize, encapsulate, and/or decouple units in the computer system.

In some implementation, each respective source code-related object (i.e., object that has source code) that get extracted from the computer system will relate to one and only one of the respective packages from the computer system. Of course, in some instances, a single package may contain more than one object (in fact, some contain many objects). For example, a package called "Package1" might contain five different objects: 2 Reports, 2 Functions, and 1 Function group.

In some implementations, some (or all) of the objects may be compressed and/or encrypted when they are extracted from the computer system. In those implementations, additional processing (e.g., decompression and/or decryption) may be required on the extracted source code, for example, to access the underlying plain text associated with the extracted source code. In those types of implementations, the EPF 102 may include one or more decompressors (shown in FIG. 1) and/or one or more decryption engines (not shown in FIG. 1), as appropriate.

Generally speaking, the details of the process used to extract a particular object may depend on whether that particular object has source code or not.

Figure 3:
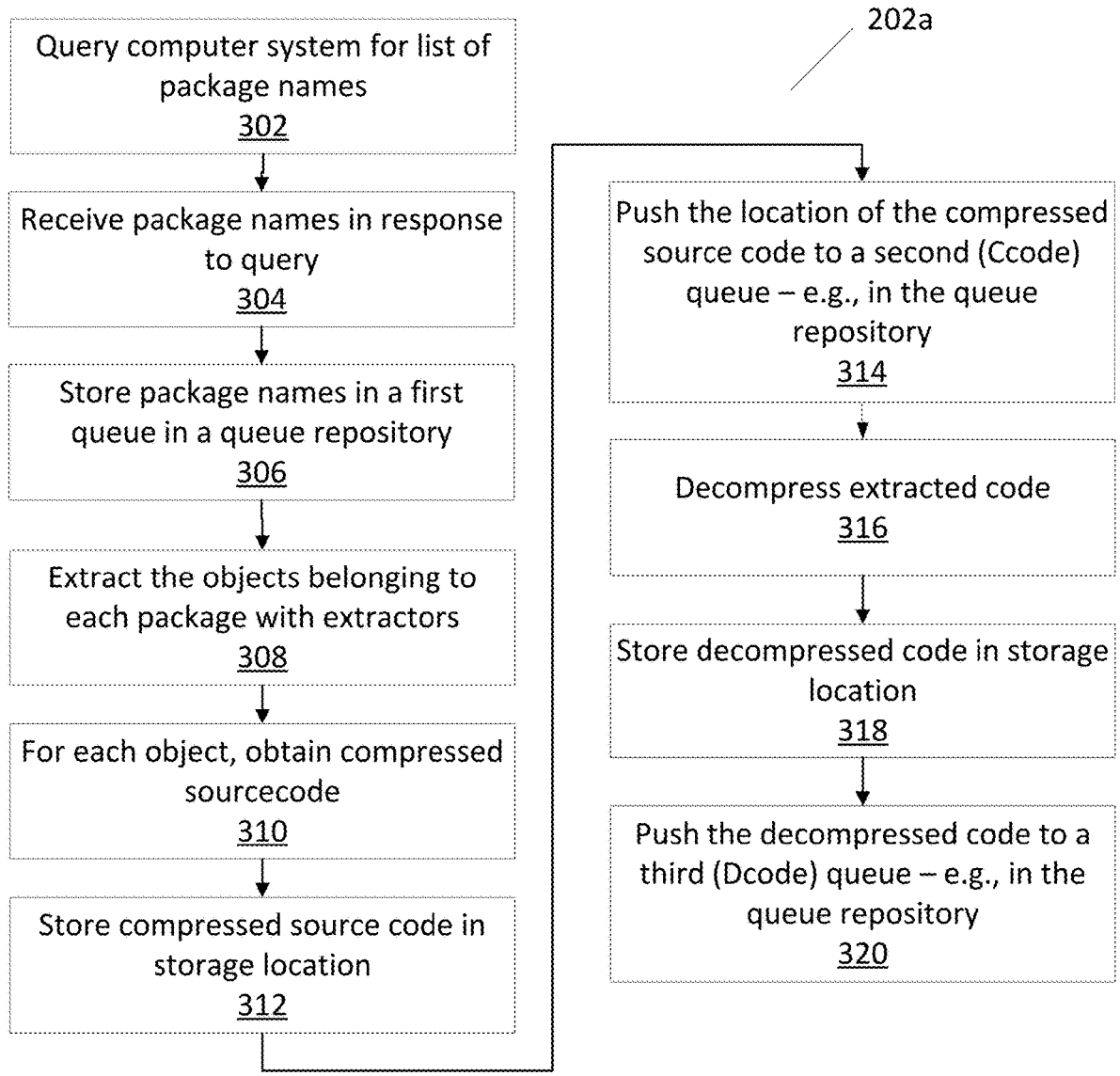
FIG. 3 is a flowchart showing an exemplary process whereby the EPF of FIG. 1 extracts objects (that have source code) from the computer system of FIG. 1.

FIG. 3 details an exemplary implementation of the EPF 102 extracting (202a) objects that have source code from the computer system 100.

First, according to the illustrated implementation, the EPF 102 queries (at 302) the computer system 100 (e.g., from the SAP® company) for the names of the packages associated with the computer system 100. In response to this query, the leader 110 worker module (at 304) receives a list of package names associated with the computer system 100 and (at 306) stores that list of package names in a first queue (i.e., the packages queue 126) of the queue repository 108. These concepts are represented schematically in FIG. 8A. In the exemplary implementation represented in FIG. 8A, and elsewhere in this application, the queue repository may be Redis™ queue repository software but, of course, other queue repository software may be used instead.

Next, according to the illustrated implementation, the EPF 102 (at 308) extracts the source code from the computer system 100. More particularly, in this regard, after the EPF receives the list of package names (at 304), one or more of the extractors 112 start extracting the source code from the computer system 100.

As the source code can be divided into packages, in a typical implementation, each one of the involved extractors 112 may select a particular package name from the first queue (i.e., the packages queue 126) and start to extract, from the computer system 100, all of the objects associated with the source code from the package having the selected package name. Once all of the objects associated with the source code having the selected package name have been selected, the extractor may select a different (previously unselected) package name from the packages queue and start to extract, from the computer system 100, all of the objects associated with the source code from the package having that different (previously unselected) package name. In a typical implementation, each specific extractor (from a plurality of extractors) will proceed in this manner—operating in parallel—until all of the packages from the computer system have had their source code extracted.

According to the illustrated implementation, for each respective object in a selected package, the extractor 112 (at 310) obtains the source code, which may be compressed, saves (at 312) the compressed source code in a first computer-based memory (e.g., "storage I") 144, and pushes (at 314) the location of this stored compressed source code to the CCode queue 128. Code in this example stands for "Compressed Code." These concepts are represented schematically in FIG. 8B. In a typical implementation, once an extractor 112 finishes extracting all of the source code for a selected one of the packages, that extractor will select another package name from the packages queue and essentially repeat the steps outlined above. This process is generally repeated until all of the packages identified in the packages queue 128 have been extracted.

One benefit of having source code that is already divided into packages before extraction is that the extraction process can easily be performed in a distributed fashion (i.e., with multiple extractors 112 working simultaneously on different packages), which can help the system operate more quickly and potentially with greater accuracy.

Next, according to the illustrated implementation, the compressed source code that has been extracted from the computer system is decompressed (at 316). Decompression may be performed by one or more decompressors 114. In some implementations, each time an extractor 112 finishes extracting the source code for a particular object (there is generally no need to finish extracting all of the objects in a package before proceeding), one of the decompressors 114 learns of the location for that package from the CCode queue 128, and obtains the compressed source code for the corresponding object from the first computer-based memory storage 144. The decompressor 114 then decompresses the source code for that object and (at 318) stores the decompressed source code in a second computer-based memory storage (e.g., "storage II" in FIG. 1) 146. The location of the decompressed code for that object is then pushed (at 320) to the DCode queue 130 in the queue repository 108. DCode stands for Decompressed Code. This is represented schematically in FIG. 8C.

Figure 4:
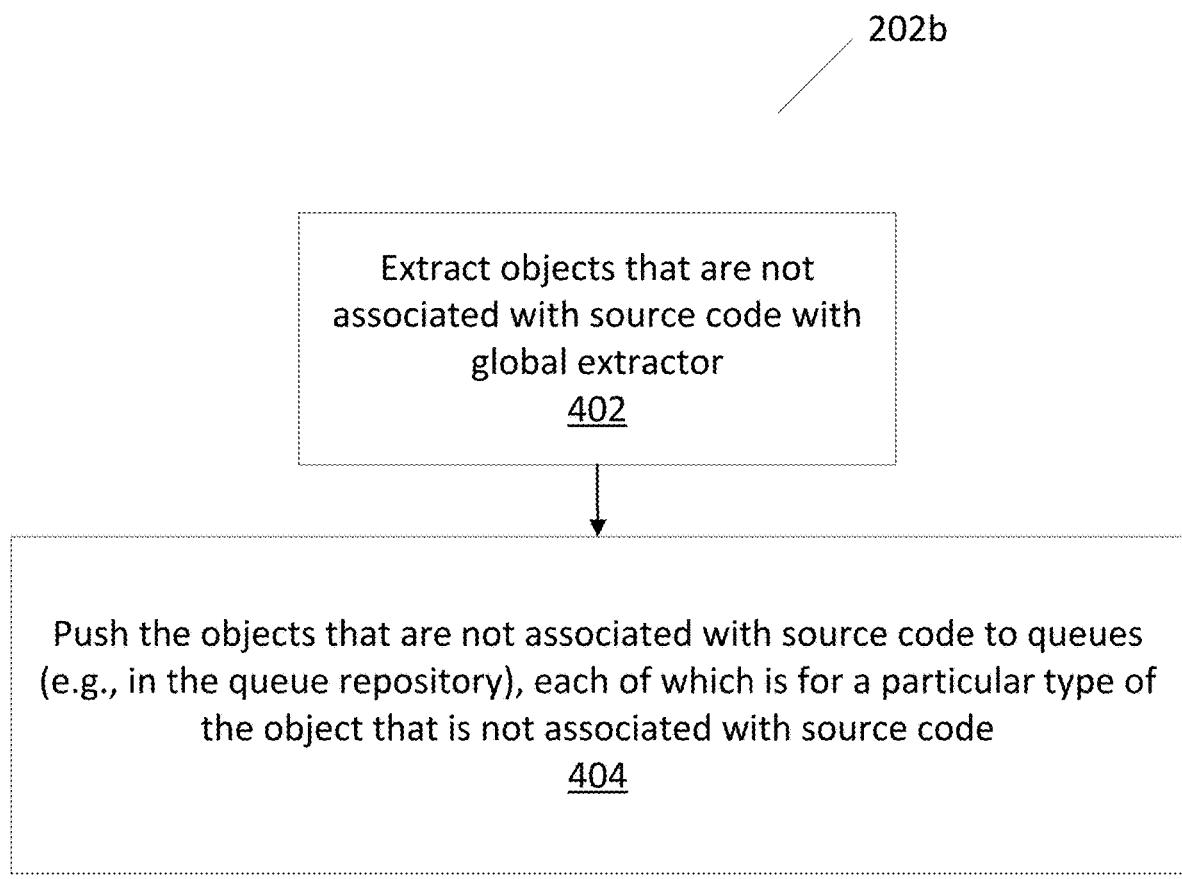
FIG. 4 is a flowchart showing an exemplary process whereby the EPF of FIG. 1 extracts objects (that do not have source code) from the computer system of FIG. 1.

As previously mentioned, in a typical implementation, there are some objects that do not have source code. FIG. 4 details an exemplary process (202b), performed by the EPF 102, for extracting non-source code-based objects from the computer system 100. These kinds of non-source code-based objects, which may be referred to as Globals (or global objects), tend to be easier to extract than source-code based objects. Some of the non-source code-based objects may be related to packages and some of the non-source code-based objects may not be related to packages.

According to the illustrated implementation, the non-source code-based objects are extracted (at 402) from the system 100 by the extractorG 116. In this regard, the extractorG 116 extracts all global objects, and, as they do not have any source code to decompress, the extracted global objects may be pushed (at 404) directly into different object queues 132 (e.g., table object type queue, authorization object type queue, transaction code object type, . . . object type N queue) in the queue repository 108. Generally speaking, in order to effectively organize this information, there is one queue for each type of non-source code-based object. This is represented schematically in FIG. 8D.

Referring again to the flowchart of FIG. 2, after extracting the objects from the computer system 100, the exemplary method includes (at 204) storing the extracted objects in a search platform 152.

The search platform 152 can be virtually any search platform. In one exemplary implementation, the search platform is the Solr™ platform, which is an open source enterprise search platform from the Apache™ Software Foundation. In a typical implementation, the SOLR platform may facilitate one or more of: full-text searching capabilities, hit highlighting, faceted searching, real-time indexing, dynamic clustering, database integrating, NoSQL features, rich document (e.g., Word, PDF) handling, etc. Providing distributed search and index replication, the Solr™ platform is also generally designed for scalability and fault tolerance.

Figure 5:
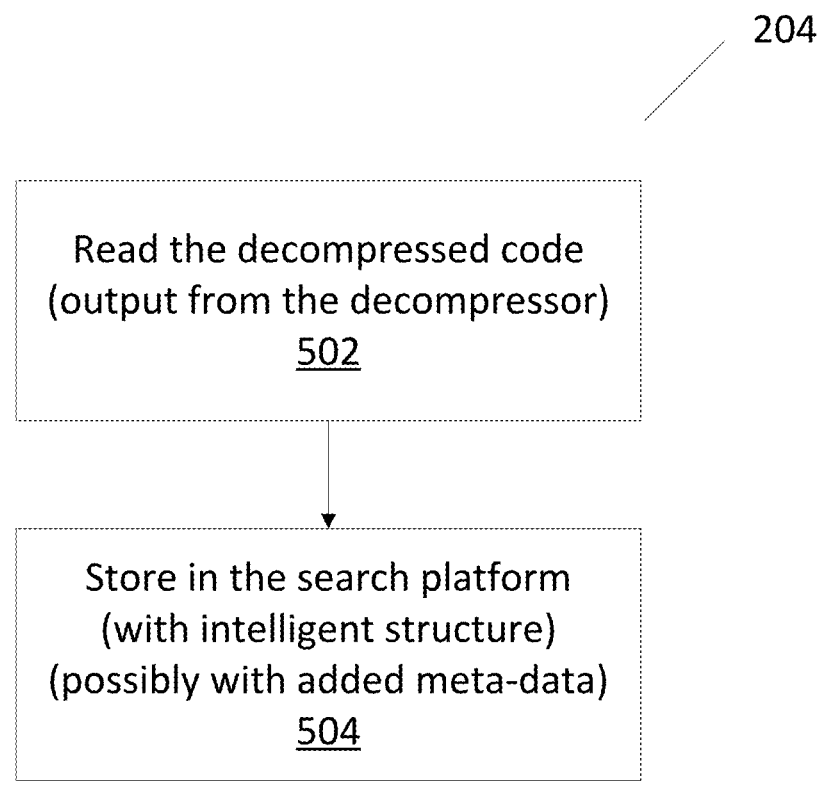
FIG. 5 is a flowchart showing an exemplary process whereby the EPF of FIG. 1 stores the extracted objects in a search platform.

In a typical implementation, one or more of the Solr uploaders 118 (at 502, see FIG. 5) reads the decompressed source code from the second computer-based memory storage ("storage II") 146 (based on the location information in the DCode queue 130) and reads the non-source code-based objects from the different object queues 132. The one or more Solr uploaders 118 (at 504, see FIG. 5) store everything they read into the SOLR™ platform with an intelligent structure, perhaps adding in some meta-data too to facilitate future searches. The Solr™ platform is generally very efficient in performing text searching and also has a great rate of compression, which means that the size used to store the objects generally can be much smaller than would be required if simply storing the data in a file system. This is represented schematically in FIG. 8E.

Referring again to the flowchart of FIG. 2, after storing the extracted objects in a search platform, the exemplary method includes (at 206) finding relationships between the stored objects.

In a typical implementation, whether two objects are related (or not) may depend on context. For example, if the objects are or include programming objects, a person may want to know when a particular object uses another object, or when a particular object is an instance of another object, etc. If such uses or instances exist, then, depending on context, the indicated objects might be considered to be related to one another. Alternatively, one may want to know when a particular piece of code reads from a particular table, or when a particular functionality checks for a particular authorization object or a particular privilege, or when a particular web service executes a particular program, etc. If such reading, checking, or executing exists, then, dependent on context, the indicated objects might be considered to be related to one another. These are just some examples of possible relationships that could be of interest to an end-user.

In one exemplary implementation, the types of relationships that the system 100 finds between objects might include: Calls (e.g., relationship used when an object calls another object), Contains (e.g., relationship between a Package object and any other object), Checks (e.g., relationship between any object and an authorization check object), Includes (relationship between any object and an Include object), Implements (relationship between a Class object and a method object), Handles (relationship between an ICF service object and a Class object), Belongs (relationship between a Package object and a Component object), Defines (relationship between any object that creates a new subroutine and the Subroutine object), and Performs (relationship between any object that executes a subroutine and the Subroutine object).

Figure 6A:
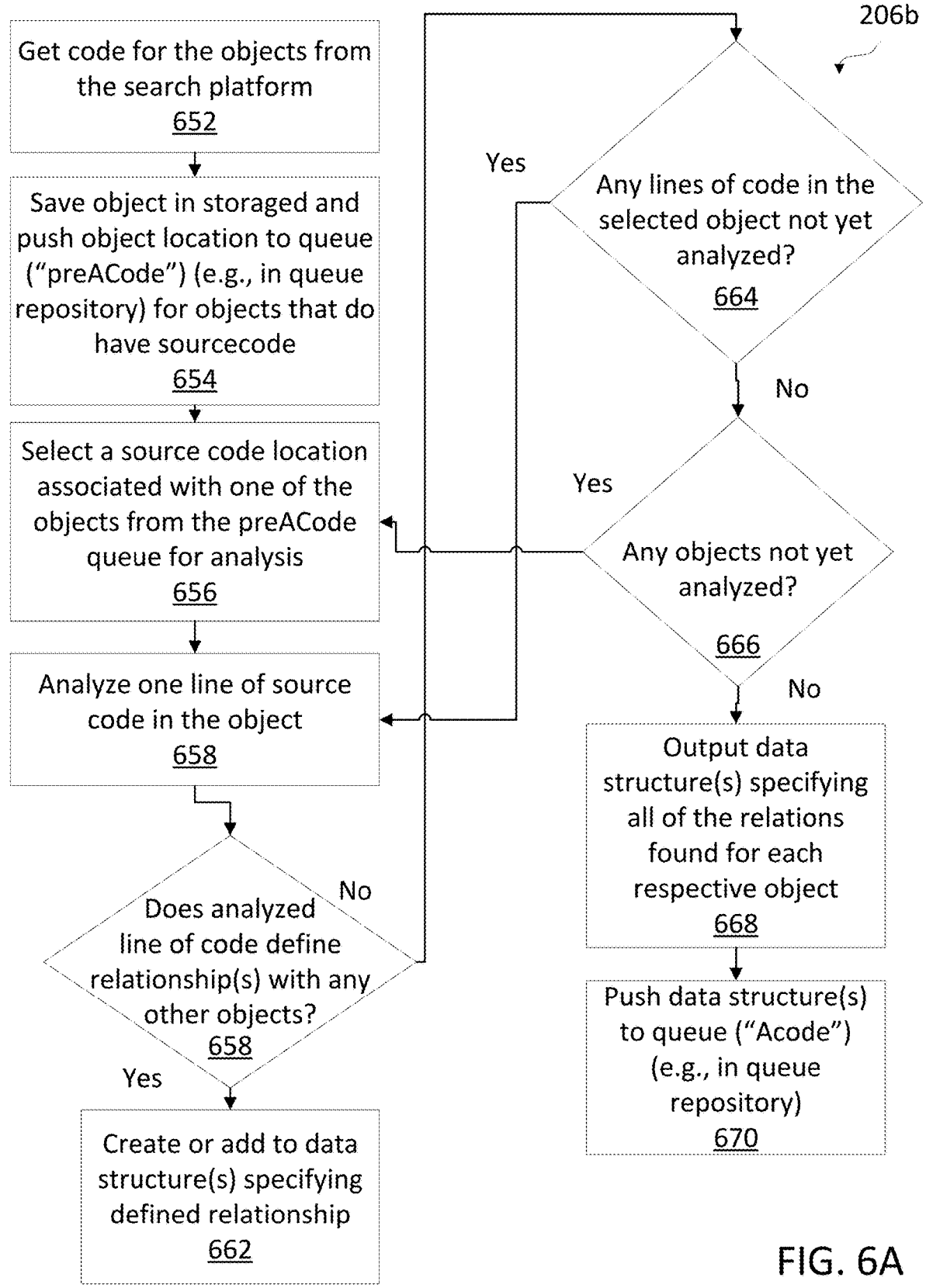
FIG. 6A is a flowchart showing an exemplary process whereby the EPF of FIG. 1 finds relationships between an object (that has no source code) and other objects.
Figure 6B:
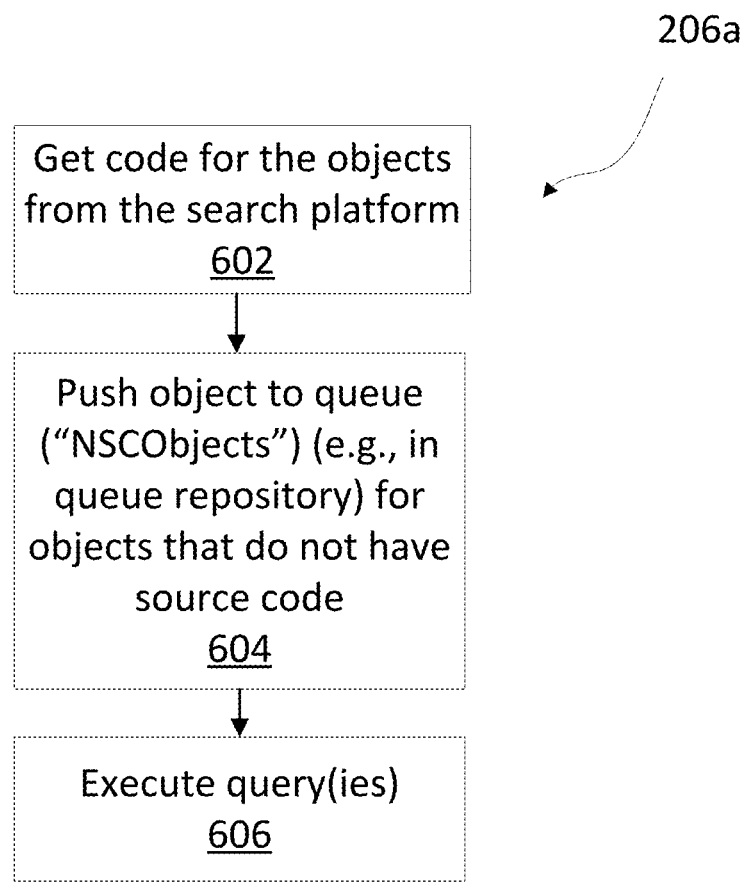
FIG. 6B is a flowchart showing an exemplary process whereby the EPF of FIG. 1 finds relationships between an object (that has source code) and other objects.

As we have already mentioned, objects can be divided in two groups: objects that have source code, and objects that do not have source code. FIG. 6A is a flowchart showing an exemplary process for finding relationships for an object that has source code. FIG. 6B is a flowchart showing an exemplary process for finding relationships for an object that does not have source code.

For objects that do not have source code (FIG. 6B), finding relationships to other objects tends to be relatively straightforward, because the system 102 itself provides the needed information to understand if two particular objects are related. For instance, to know which class handles a certain ICF service, all that may be required is to execute a particular query.

For objects where there is source code, finding relationships to other objects can be much more complex. For objects where there is source code (FIG. 6A), the system 102 typically reads each statement of the source code and, attempts to understand if any statements in the source code might define a relationship between objects.

In an exemplary implementation, analyzing the source code of a Report object called 'Report1' might reveal the following statement:
    CALL FUNCTION function1.
The presence of this statement in Report 1 indicates that there is a relationship of the type "CALLS" between the object Report1 and the object Function1. In a typical implementation, the system 102 of FIG. 1 is configured to be able to make this kind of determination.

As another example, analyzing the source code of a Function object called 'Function1' might reveal the following statements:
    AUTHORITY-CHECK OBJECT 'AUTH_OBJ_1'
    ID 'FIELD1' FIELD 'VALUE01'
    ID 'FIELD2' FIELD 'VALUE02'.
The presence of these statements in Function 1 indicates that there is a relationship of the type "CHECKS" between the object Function1 and object AUTH_OBJ_1. In a typical implementation, the system 102 of FIG. 1 is able to make this kind of determination.

Code analysis in this regard may be carried out, in a typical implementation, by the one or more analyzers 122. Typically, each analyzer 122 takes as its input the source code of an object and essentially reads one statement at a time from the source code of the objects. The algorithm(s) executed by the analyzer 122 in this regard can include varying levels of complexity. For example, the algorithm(s) are generally adapted to deal with things such as asynchronism (for example: in order to find a specific type of relationship one may query the graph database once all the EPF processes are finished and then reload it with further calculated relationships) and not-explicit-statements.

Assume the source code for a particular object includes the following two statements in Report1:
    x='function1'.
    CALL FUNCTION x.
In that case, the EPF 102 is able to determine—by considering multiple (e.g., two or more) lines of source code—that there is a relationship "CALLS" between Report1 and function1. In some instances, some (or all) of the multiple lines of source code considered are consecutive lines of source code. However, that is not required. Indeed, in some instances, some (or all) of the multiple lines of source code may be not consecutive lines of source code.

In some implementations, in order to find relationships among the objects, the one or more SOLR Downloaders 120 (at 602 in FIG. 6A and 652 in FIG. 6B) accesses the objects stored in the SOLR platform.

If a particular object does not have any related source code (FIG. 6A), the object will be pushed (at 604, FIG. 6A) directly to the NSCObjects queue 136 ("NSCObjects" stands for Non-SourceCodeObjects). At this point, any relationships can be found by executing appropriate query(ies) (at 606).

If a particular object does have associated source code (FIG. 6B), the source code is saved in the third computer-based memory storage ("Storage III") 148 and its location is pushed to the preACode queue 134 ("preACode" stands for pre Analyzed Code).

Figure 8A:
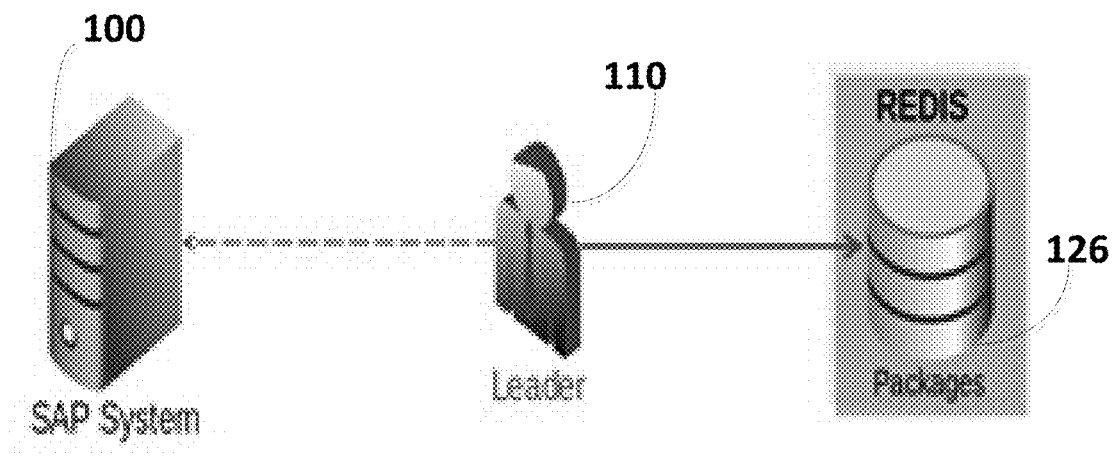
Figure 8B:
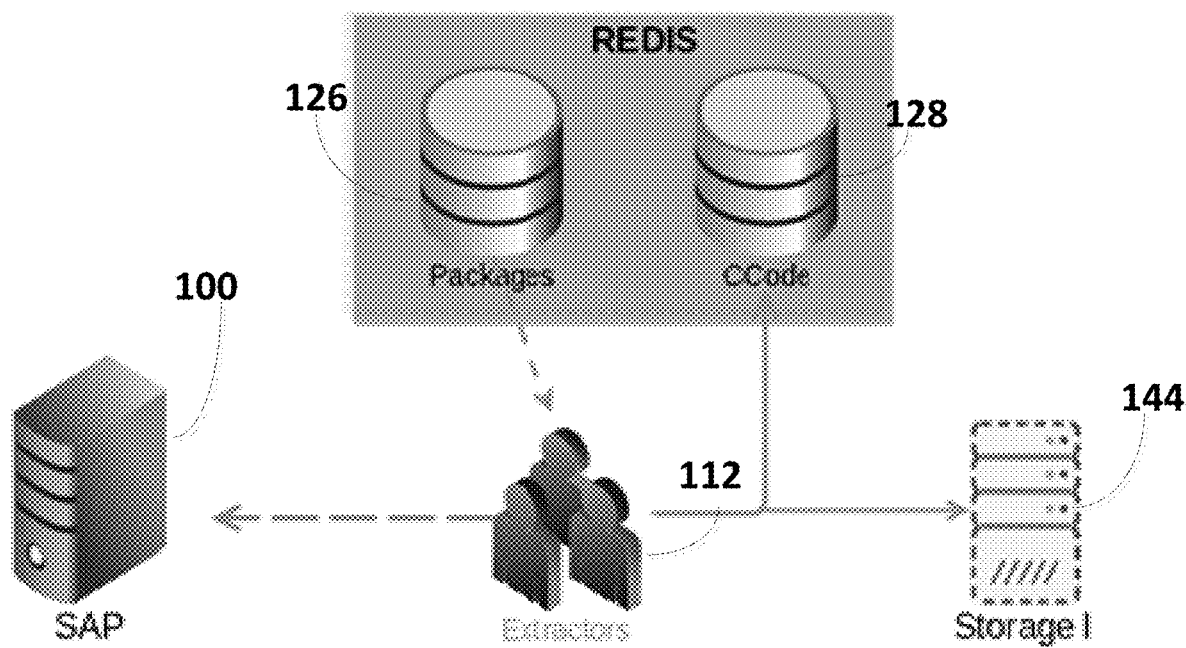
Figure 8C:
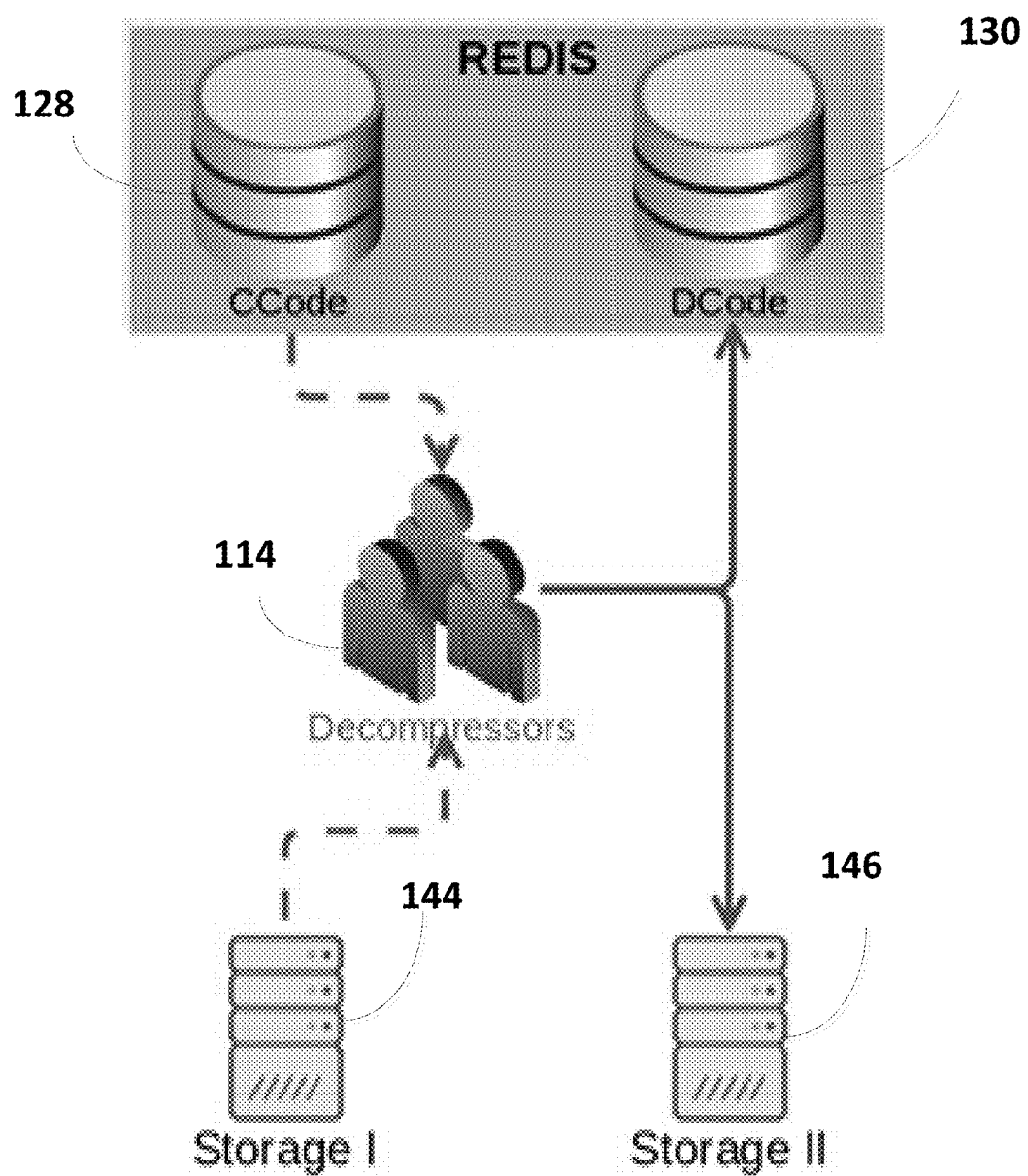
Figure 8D:
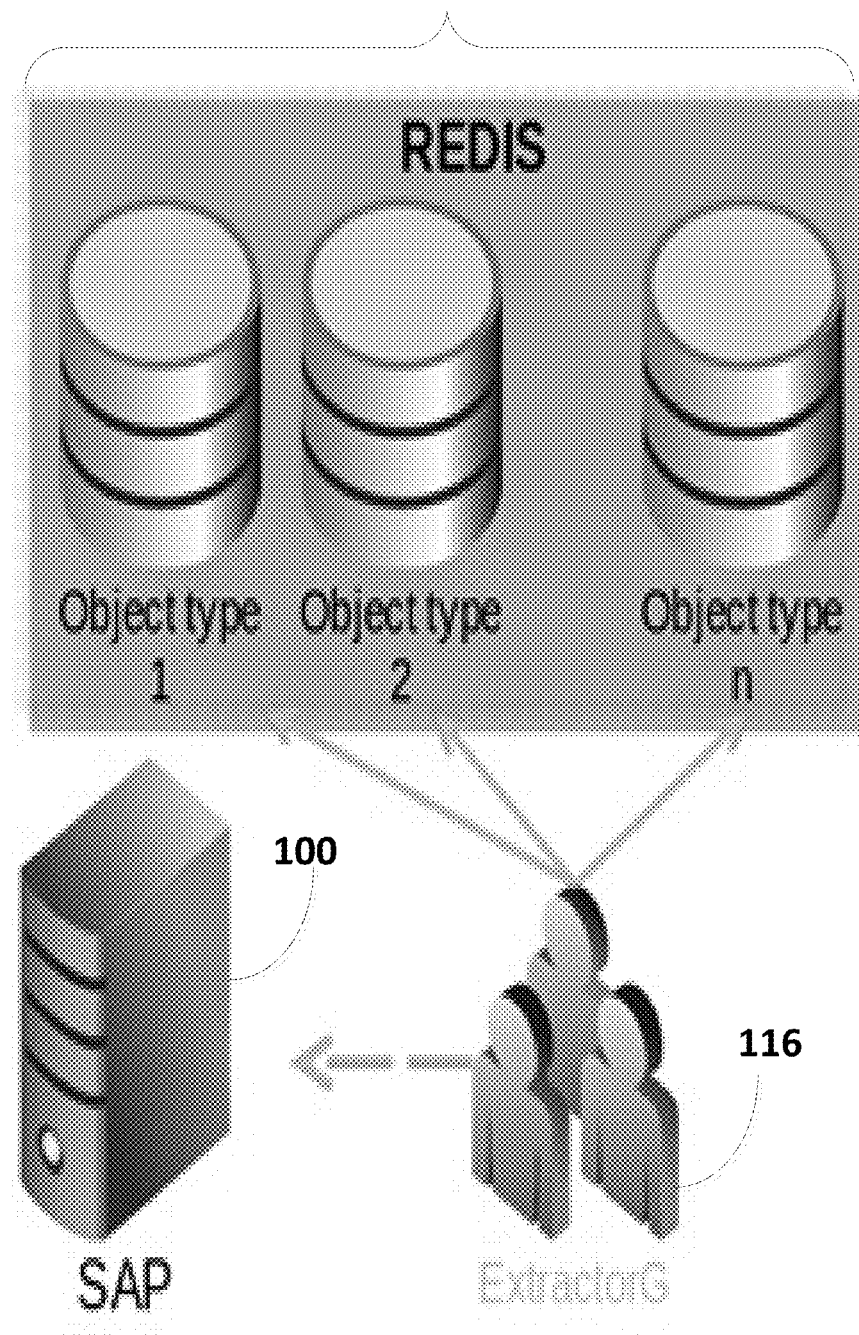
Figure 8E:
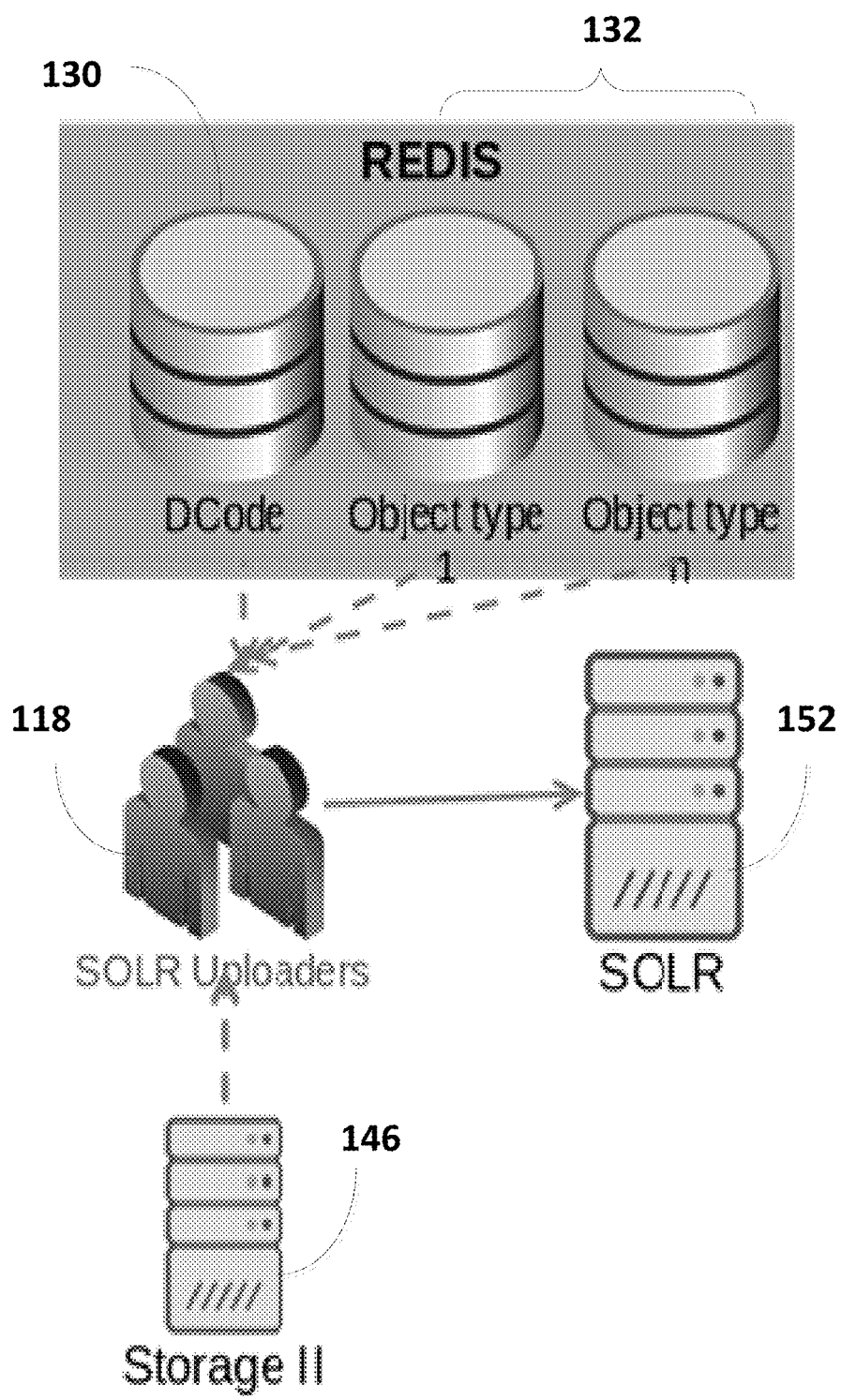
Figure 8F:
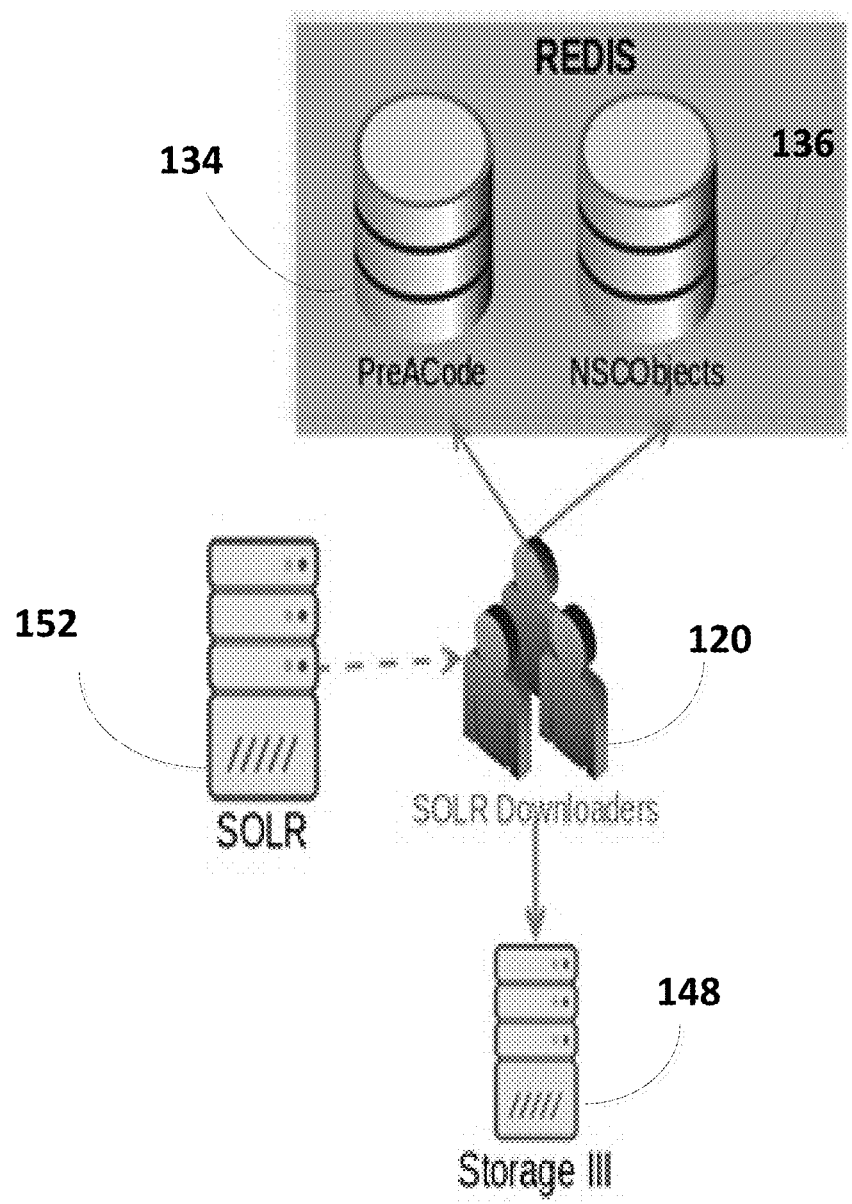

The foregoing is represented schematically in FIG. 8F.

Next, each respective one of the analyzers 122 will select (at 656) a particular source code location, that corresponds to an object to be analyzed, from the preACode queue 134, get the source code stored at the indicated location from the third computer-based memory storage ("Storage III") 148 and begin analyzing that source code. According to the illustrated example, each analyzer 122 analyzes the source code for a particular object one line at a time (see 658). In this regard, the analyzer 122 determines (at 660) whether the particular line of source code under consideration defines or indicates any relationships with other objects. If so, the system creates or adds to a data structure for that object to identify all of the identified relationships for that object. Then, the analyzer 122 determines (at 664) whether there are any lines of source code associated with the object under consideration that have not yet been analyzed. If so, the analyzer 122 selects the next line of source code for the object under consideration and analyzes it (at 660). Otherwise, the analyzer 122 considers (at 666) whether there are any other objects whose source code has not yet been analyzed by it or by any of the other analyzers. If so, the analyzer selects (at 656) a new source code location for an as-yet unanalyzed object and begins to analyze the corresponding object—again, typically, one line at a time. If the analyzer 122 determines (at 666) that all of the objects have been analyzed already, then the analyzer(s) 122, in the illustrated implementation, output (at 668) a data structure for each analyzed object that specifies all of the relationships for each respective analyzed object. Of course, in various implementations, the analyzer(s) 122 may output these data structures one by one as each one gets produced—and not wait until all of the objects have been analyzed. These data structures are pushed (at 670) to the ACode queue 138 ("ACode" stands for AnalyzedCode).

Figure 8G:
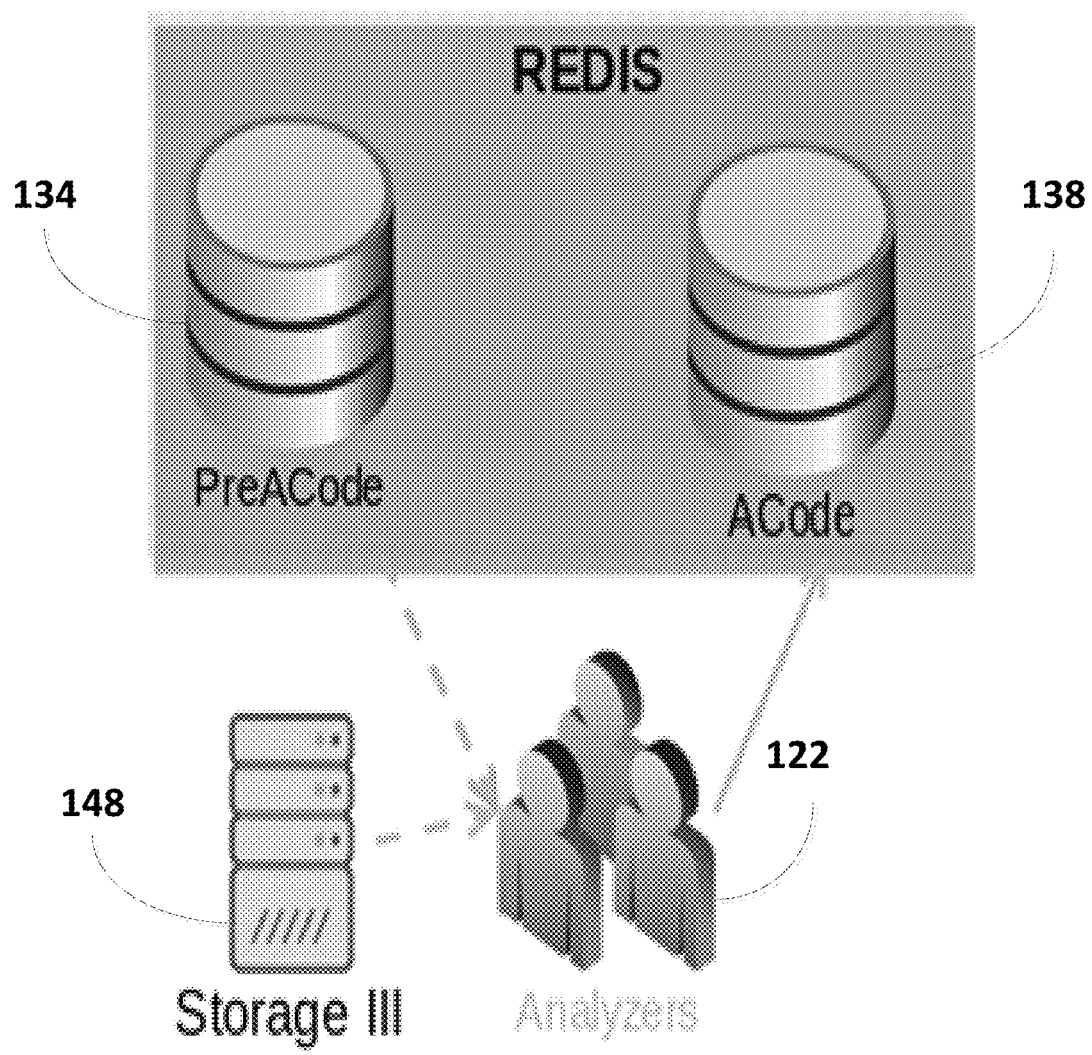
Figure 8H:
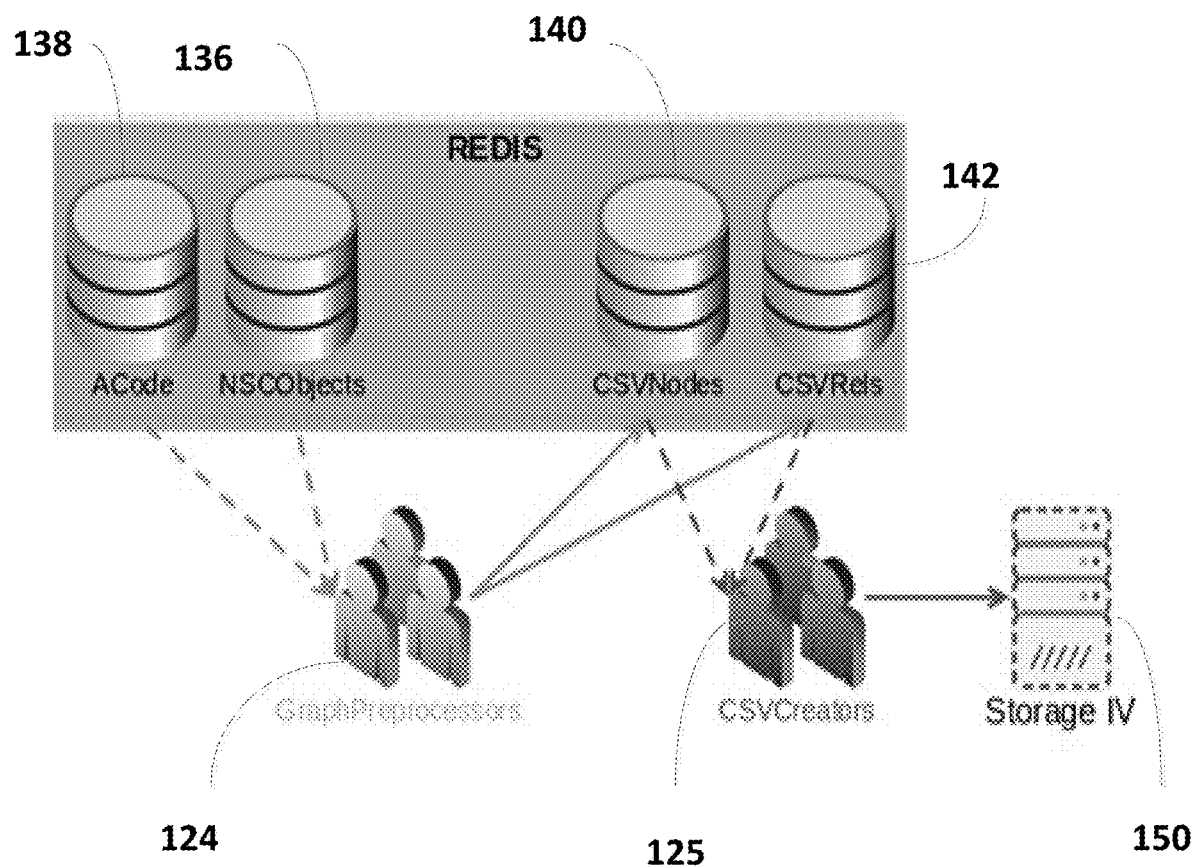

The foregoing is represented schematically in FIG. 8G.

Referring once again to the flowchart of FIG. 2, after finding relationships between the objects extracted from the computer system 100, the exemplary method includes (at 208) organizing the extracted data, including the objects and their respective relationships, in a particular way that will facilitate its further usage. More particularly, in the illustrated implementation, organizing the data in this manner entails creating a graph database to facilitate visualization of the objects of the computer system 100 and their respective relationships to one another.

In some implementations, the graph database is a database that uses graph structures for semantic queries with nodes and connections between nodes respectively representing objects and relationships between objects. This kind of database may allow the stored data to be linked together directly, and in many cases retrieved with one operation.

In a typical implementation, producing the graph database and making available relatively simple querying functionality, and facilities for graphical visualization provide a most useful tool for analyzing and understanding the computer system 100 at issue and leveraging that information toward improving overall computer system 100 performance, security, etc.

In this regard, in a typical implementation, the EPF 102 may apply graph theory to model information in a way that can help answer questions that would not be easy to respond to if the information were not so modeled in this fashion.

Figure 7:
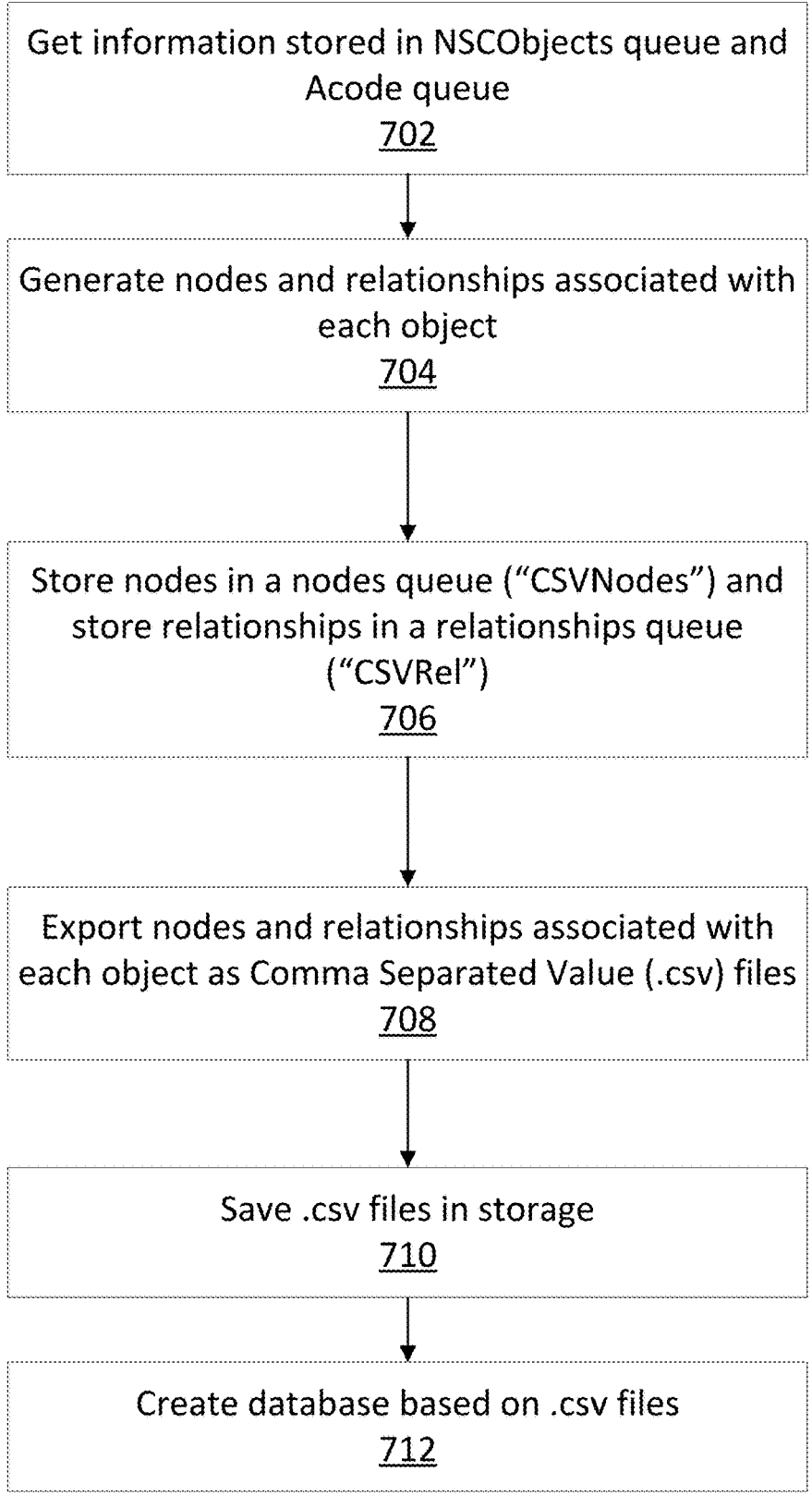
FIG. 7 is a flowchart showing an exemplary process whereby the EPF of FIG. 1 creates a graph database to facilitate visualization of the computer system.

In a typical implementation, and referring now to the exemplary implementation in FIG. 7, the GraphPreprocessors 124 (at 702) get the information that is stored in the NSCObjects queue 136 and the ACode queue 138 and generate (at 704) the nodes and the relationships (edges) among the nodes in a particular structure (e.g., where each node corresponds to an object). As an example, this is what the particular structure for REPORT1 and FUNCTION1 showing all their outgoing relationships might look like:
'REPORT1': {'CALLS': ['REPORT2', 'FUNCTION1'],
  'PERFORMS': ['SUBROUTINE1'],
  'CHECKS': ['AUTHOBJ1'],
  'INCLUDES': ['INCLUDE1', 'INCLUDE2', 'INCLUDE3']}
'FUNCTION1': {'CALLS': ['FUNCTION2'],
  'PERFORMS': ['SUBROUTINE2', 'SUBROUTINE3'],
  'CHECKS': ['AUTHOBJ2', 'AUTHOBJ3', 'AUTHOBJ4']}

Next, in the illustrated implementation, the particular structure(s)—representing the nodes (objects) and associated relationships are stored (at 706). In this regard, the CSVNodes queue 140 will store information about each nodes and the CSVRel queue 142 will store information about the relationships between nodes (objects). According to the illustrated implementation, the system is configured to produce (at 708) a standard structured output by exporting the graph logic (e.g., the nodes and their corresponding relationships) as Comma-Separated Value (CSV) structures. This job is done by the CSVCreators 125, which may be in charge of reading the output of the GraphPreprocessors 124 and generating Comma Separated Values files (.csv) which will be saved (at 710) in a computer-based memory storage ("Storage IV") 150. The foregoing is represented schematically in FIG. 8H.

This is an example of the list of CSVNodes for Reports:
  Node ID,Object Name
  1,Report1
  4,Report2
  5,Report3
This is an example of the list of CSVNodes for Functions:
  Node ID,Object Name
  2,Function1
  3,Function2
  6,Function3
This is an example of the list of CSVNodes for Authorization Objects:
  Node ID,Object Name
  7,AuthObj1
  8,AuthObj2
  9,AuthObj3
This is an example of the list of CSVRels (there is typically only one list for all the relationships):
  Relationship ID,Origin Node,Destination Node,Relationship Type
  1,1,9,CHECKS
  2,1,2,CALLS
  3,2,4,CALLS
  4,2,7,CHECKS
  5,2,6, CALLS The final part of the process represented in FIG. 7 is the creation (at 712) of a database that may be based on the CSV files. In some implementations, a software tool called neo4j may be used to do this. An example of what this type of database would represent (graphically) is shown in FIG. 9, which includes many nodes (circles), each of which represents an object from the computer system 100, and lines interconnecting the nodes to indicate relationships, functional or otherwise, there between.

This tool facilitates loading the CSV files into a database, so that the database can be queried—asking about nodes and relationships and producing (e.g., at a computer screen at a computer terminal, etc.) a visualization of the results.

As an example, if a particular user wanted to know all the objects that at some point would call a specific report, he or she could ask: "I want all nodes that have a relation of type CALLS to the node of name 'Report1'", or in other words: "I want all the objects that calls Report1 in some part of its code". In a typical implementation, being able to answer this kind of query, opens up a very wide window of possibilities for gaining intelligence over the objects, and finding interesting patterns that would not be available without access to the functionalities disclosed herein. Indeed, there are several possible applications for this technology some of which are specifically mentioned herein.

Automatic Impact Assessment of Patch Implementation

An entry point finder (EPF) can be leveraged to help assess the impact of patch implementation on a computer-based target system.

From time-to-time computer systems need to be, or at least should be, patched. Generally speaking, a patch is a piece of software designed to update a computer program and/or its supporting data, to fix or improve it. Patches may, for example, fix security vulnerabilities and/or other bugs and/or improve system usability or performance. Although intended to fix problems and make systems better, a poorly designed patch can sometimes introduce new problems into the system. In some instances, a patch update may break a particular functionality, for example, by removing components that may be required to support that functionality. For these, and some other, reasons, companies can be reluctant, or simply refuse, to implement patches that may truly be needed.

This problem is sometimes compounded by the fact that patches do not generally come with sufficient information to facilitate thorough testing of the patch and/or the patched system after that patch has been implementation. For compliance, regulatory and/or other reasons, for example, companies may need or want to show that an implemented patch and/or the resulting patched system are operating properly and have been tested to prove that fact. The testing, in this regard, may ease concerns about whether a particular patch may have created a problem in a particular system.

Of course, computer systems can be very large and complex, and often, no one person or even group of people may have a thorough understanding of the system and/or the impact that a particular patch might have on a large and complex system. For some of these companies, it can be difficult, if not impossible, to even figure out how to test an implemented patch or the resulting patched system to confirm the absence of any patch-created problems.

In addition, of course, if there is a break that occurs due to a patch being implemented, the resulting damage can be severe. In fact, in some instances, if a process, particularly a critical one, is broken or disrupted, the consequences that flow from that break or disruption may end up being worse than any consequences that would have come from simply leaving the system unpatched (and, therefore, potentially vulnerable).

In certain implementations, the entry point finder (EPF) concepts disclosed herein can be applied advantageously to help address these sorts of concerns by making it easier to understand the impact that a particular patch might have on a computer system. In this regard, reference is made to FIG. 10, a schematic representation of an exemplary impact assessment system 1000, in which an EPF 102 is being used to help assess the impact that a particular patch (or patches) might have on a particular target computer system 1100 where the patch is to be implemented.

With the insight that can be provided by the impact assessment system 1000 of FIG. 10, a system administrator can be confident that a robust, yet efficient, testing regime can be designed to check whether any problems may have been created by deploying a patch on a particular system. This kind of testing will either confirm that no such problems exist, or if such a problem exists, the system administrator will have enough knowledge to effectively manage the problem before it damages the company.

The illustrated impact detection impact assessment system 1000 has a user activity extractor 1502, a first computer database ("knowledge base of activity") 1504, a second computer database ("knowledge base of patches") 1506, a third party missing patches detector 1508, a fixed objects identifier 1510, the EPF 102, a relevant entry points calculator 1512, and an impacted users calculator 1514.

According to the illustrated implementation, the user activity extractor 1502 is communicatively coupled to the target system 1100, and the knowledge base of activity 1504 is communicatively coupled to the user activity extractor 1502. The fixed objects identifier 1510 is communicatively coupled to the knowledge base of patches database 1506 and to the third party missing patches detector 1508. The EPF 102 is communicatively coupled to the fixed objects identifier 1510. The relevant entry points calculator 1512 is communicatively coupled to the knowledge base of activity database 1504 and to the EPF 102. The impacted user calculator 1514 is communicatively coupled to the relevant entry points calculator 1512.

In the illustrated implementation, the relevant entry points calculator 1512 is configured to output a list of relevant entry points to test by patch 1516 and the impacted users calculator 1514 is configured to output affected users by patch 1518.

In a typical implementation, the user activity extractor 1502 can be or can include virtually any kind of technology that is capable of extracting or learning what specific activities are actually executed by users on the system 1100 during a particular period of time. In this regard, the user activity extractor 1502 may query the target system 1100 for information about the end user activities on target system 1100. In some implementations, the user activity extractor 1502 includes or leverages a system logging feature to learn what specific activities are actually executed. The system logging feature may related to, for example, security audit logs, audit trails, user activity logs, business transaction logs, HTTP access logs, etc.

Generally speaking, a security audit log (from the SAP® company, for example) may be considered to be a tool that creates records of various types of activities that occur in a system (e.g., 1100). Some of the items that a security audit log might record include: security-related changes to the system 1100 (e.g., changes to user master records), information regarding logon attempts (e.g., successful and/or unsuccessful logon attempts), and/or information that enables the reconstruction of a series of events (e.g., successful or unsuccessful transaction starts). More specifically, in some implementations, the following types of information may be automatically recorded in a security audit log: successful and unsuccessful dialog logon attempts, successful and unsuccessful remote function call (RFC) logon attempts, RFC calls to function modules, successful and unsuccessful transaction starts, successful and unsuccessful report starts, changes to user master records, changes to the audit configurations, users logins, transactions started, reports executed, other function calls, roles assignments, system shutdowns, audit changes, etc. An audit trail may be, for example, a security-related chronological record, set of records, and/or destination and source of records that provide documentary evidence of a sequence of activities that have affected at any time a specific operation, procedure, or event in the system 1100. A user activity log may be, for example, a transcription of various activities, etc., including, for example, names of applications run, titles of pages opened, URLs, text (typed, edited, copied/pasted, etc.), commands, and/or scripts. A business transaction log may include, for example, a detailed record of all activity that relates to business transactions for a company. An HTTP access log may include, for example, a detailed of all successful and unsuccessful attempts to access, for example, an HTTP address.

The knowledge base of activity 1504 can be, for example, any kind of computer-based database that contains information about activities on the system. Generally speaking, the knowledge base of activity 1504 will include, or eventually be loaded with, a list that identifies all of the user activities (and/or other activities) on or related to the system during a particular period of time. The knowledge base of patches 1506 can be, for example, any kind of computer-based database that contains, or will eventually be loaded with, a list that identifies all of the patches available for a given product. In some exemplary implementations, the knowledge base of patches 1506 may include, for each patch, a patch identifier (ID), a title, criticality of the patch, components affected by the patch, and/or solutions associated with the patch.

At a high level, the illustrated impact assessment system 1000 is configured to identify any entry points (e.g., objects that can be executed by an end-user) in the target system 1100 that may be impacted by one or more patches being implemented on the target system 1100 and that actually have been used by an end user of the target system 1100 within some end user-specified period of time. Once identified, these, and possibly only these, end points can be tested to efficiently confirm that the patch implementation did not create any problems with the target system 1100.

FIG. 11 is a flowchart of just such an exemplary process that involves identifying, with the impact assessment system 1000, any entry points in a target system 1100 that have been or will be impacted by the implementation of one or more patches on the target system 1100 and that have been used by end users of the target system 1100 within some user-specified period of time. The illustrated flowchart also shows testing of the system after patch implementation, with a particular focus on the identified impacted entry points, to efficiently check whether the implemented patch(es) may have created any problems with respect to the target system 1100.

According to the illustrated process, a user of the system specifies (at 1520) a time period that the impact assessment system 1000 should consider relevant for purposes of identifying actual end user activities that have happened or that will happen on the target system 1100. In this regard, the impact assessment system 1000 may have a computer-based user interface terminal (not shown in FIG. 10), with a screen that enables or prompts the user to specify a desired time period. The time period may be associated with virtually any length of time (e.g., a day, a week, a month, three months, a year, etc.) and may start at virtually any particular point in time.

In a typical implementation, the impact assessment system 1000 is configured to consider any end user activities that may have occurred (or that will occur) on the target system 1100 during the user-specified time period. Generally speaking, of course, if the user-specified time period is longer, system 1000 accuracy (in identifying critical entry points) may be improved. That said, generally speaking, if the user-specified time period is longer, then the system 1000 may need more time to execute its intended functionalities.

Next, according to the illustrated implementation, the system 1000 (at 1522) obtains information about user activities on the target system 1100 during the user-specified time period.

If the end user has specified a particular time frame (e.g., one month), and information about user activities on the target system 1100 already has been collected for a corresponding period of time frame (e.g., the previous month), then, in some implementations, the already-collected information about user activity on the target system 1100 may be transferred substantially right away, via the user activity extractor 1502, to the impact assessment system 1000. In some implementations, however, efforts to collect information about user activities on the target system may begin only after the end user specifies the desired time frame, and, in those instances, the collection efforts would continue for the user-specified time period (e.g., one month). In the latter situation, the overall process (represented in the illustrated flowchart), of course, will be delayed until this learning step is completed.

If the target system 1100 is a typical SAP® system, then the information about user activities on the target system may come from at least two possible sources: a security audit log for the target system 1100 and/or an HTTP access log for the target system 1100. In some implementations, this information may come from one or more other source, such as a business transaction log, for example.

A typical security audit log will record a variety of different types of information (e.g., users logins, transactions started, reports executed, function calls, roles assignments, system shutdowns, audit changes, etc.). However, in a typical implementation, the impact assessment system 1000 is generally only interested in activities or events recorded by the security audit log that relate to direct user activities or operations on the target system 1100.

Therefore, in a typical implementation, the information that gets delivered to the impact assessment system 1000 from the security audit log about user activities on the target system 1100 includes information about: 1) transactions started (e.g., Transaction &A Started), 2) reports started (e.g., Report &A Started), and/or 3) successful function calls (e.g., Successful RFC Call &C (Function Group=&A)), where &A and &C are fields that may be replaced by the actual objects names. A specific example of these types of activities/events may look like this: 1) Transaction SU01 started, 2) Report RSUSR003 started, and/or 3) Successful RFC Call RFC_READ_TABLE (Function Group=SDTX).

A typical HTTP access log only records any HTTP requests performed by end-users of the target system 1100 through a web browser. These are essentially user-initiated requests to uniform resource locators (URLs), such as "192.168.100.25-user_1-[31/Oct/2002:10:46:34 +0200]" GET/catalog/index.html "200 380." In a typical implementation, the information that gets delivered to the impact assessment system 1000 from the HTTP access log about user activities on the target system 1100 includes information about the recorded user-initiated requests.

Generally speaking, information about these four types of events (e.g., transactions started, reports started, successful function calls, and URL requests) provides a fairly good indication of user activities on the target system over the specified period of time. That is because, in a typical implementation, most, if not all, user activities on a target system will involve a URL request, a transaction, a report or a function call.

In a typical implementation, once this information (about transactions started, reports started, successful function calls, and URL requests) is received by the system 1000, it may be processed to produce a table like Table 1, below:

TABLE 1

| User | Type of Activity | Object executed |
| --- | --- | --- |
| user_1 | Transaction | transaction_1 |
| user_1 | Report | report_1 |
| user_1 | Transaction | transaction_2 |
| user_2 | Transaction | transaction_3 |
| user_2 | Function | function_1 |
| user_2 | Function | function_2 |
| user_3 | Transaction | transaction_2 |

Table 1 identifies various users of the target system 1100, types of activities executed by those users on the target system, and objects executed upon through the indicated activity types. This table, or one like it, may be stored in or as the knowledge base of activity 1504.

According to the illustrated flowchart, the impact assessment system 1000 (at 1524) identifies, with the fixed object identifier 1501, any objects in the target system 1100 that either have been fixed or will be fixed by one or more patches implemented on the target system 1100. In a typical implementation, the impact assessment system 1000 does this by leveraging information in the knowledge base of patches 1506 and information identified by the third party missing patches detector 1508. In this regard, the fixed objects identifier 1510 typically accesses and/or interacts with the knowledge base of patches 1506 and/or the third party missing patches detector 1508 to identify a list of objects ("fixed objects") from the target system 1100 that have been or will be fixed by one or more patches that have been or will be implemented on the target system 1100.

Next, this list of fixed objects is provided to the entry point finder (EPF) 102 and the EPF 102 (at 1524) identifies all of the entry points on the target system 1100 that could be impacted by the fixed objects being fixed.

Next, according to the illustrated process, the impact assessment system 1000 (at 1526) cross-references the information about actual user activities on the target system 1100 during the user-specified time period against the entry points on the target system 1100 identified by the EPF 102 that could be impacted by the objects having been fixed. This cross-referencing produces (at 1528), for example, an identification of all the entry points on the target system 1100 that could be impacted by the objects being fixed and that have been used by a user during the specified period of time. Additionally (or alternatively), in some implementations, the information produced by the cross-referencing may include, for example, 1) a list of functions impacted by one or more associated vulnerabilities and that need to (or that should) be tested after the patch is implemented (fixed reason 1), 2) a list of end users that are actually using those functions and which process(es) those end users are actually involved in (fixed reason 2), and 3) with previous two items, which of the impacted functions were never used (thereby, reducing the scope of testing (time and cost).

Armed with this important information, the system administrator, for example, can design and execute (at 1530) an efficient, yet robust, testing regime on the patched target system 1100 to confirm that no problems have been created by the patch implementation, or to identify any such problems clearly so that they can be rectified.

Using an EPF to Identify Objects in the Target System Impacted by a Patch

One of the functionalities represented in the flowchart of FIG. 11, is that the EPF 102 is used to identify objects, including entry points, in the target system 1100 that have been or will be impacted by a patch.

One feature of the impact assessment system 1000 is that it has a database (i.e., the knowledge base of patches 1506) with information about the patches implemented on the target system 1100. This database 1506 generally contains a full list of available patches, and corresponding information, for a given product on the target system 1100. For each patch, the database 1506 generally contains detailed information, such as, for example: the patch ID, the title, criticality, any affected components, the solution, a fixed object, etc. From the list of attributes for each patch, an important one is the fixed object. Generally speaking, the fixed object is an object in the target system 1100 that has been (or that needs to be) modified in order to solve an issue that the patch is intended to address.

In some instances, the fixed object may be identified in the patch itself. In that case, it is generally easy for the fixed object information to be loaded into the knowledge base of patches 1506 for use by the impact assessment system 1000. However, in some instances, the patch may not include that kind of information, and so, additional processing may be required to identify the fixed object associated with a particular patch.

Generally speaking, there are several possible ways to identify a fixed object associated with a particular patch. According to one example, the impact assessment system 1000 may make a binary differential comparison or java differential comparison or plain-text code differential comparison associated with a given patch and a previous patch, or by comparing objects from the target system 1100 before patching with the same objects from the target system 1100 after patching. The differences identified by these differential comparisons would essentially identify or at least be associated with the fixed object(s) for that patch. Another possible way to identify a fixed object associated with a particular patch could entail calculating a hash for each object of the system, and then calculating the same type of hash again after applying the patch. Those objects whose hashes changed would essentially identify or be associated with the fixed object(s) for that patch.

The knowledge base of patches 1506 may have information about a wide variety of patches. However, the processing functionalities associated with impact assessment system 1000 generally only utilize information about the patches that are relevant to the target system 1100. A certain patch, for example, may apply to a certain version of a product, but not for other versions (e.g., not for a version that is on the target system 1100). Thus, in a typical implementation, the impact assessment system 1100 may be configured to filter the information in the knowledge base of patches to produce a filtered list that includes information about only those patches that are relevant to the target system (e.g., that have been, or will be, applied to the target system 1100). This filtered list of relevant patches may be produced by a third party tool, like any software product that is able to retrieve the list of relevant patches for a given system.

In a typical implementation, once the filtered list of relevant patches has been produced, the EPF 102 leverages that information. In general, the EPF 102 should be fully operational, and loaded with information from the target system 1100 when it is used to identify entry points associated with the fixed objects in the target system 1100.

In a typical implementation, for each Patch ID associated with a fixed object, the impact assessment system 1000 may query the EPF 102 for all of the entry point objects that are connected somehow to the fixed object. At the end of this process, there will be a full list of affected Entry Points for each relevant patch.

An Exemplary Implementation: An SAP® System

This (Table 2) is a simplified version of an exemplary list of relevant patches for an exemplary system A:

TABLE 2

| Patch ID | Fixed Object | Type of object |
| --- | --- | --- |
| 1 | object_1 | Subroutine |
| 2 | object_2 | Class Method |
| 3 | object_2 | Class Method |
| 3 | object_3 | Function |

In this exemplary implementation, for each distinct object identified, the impact assessment system 1000 refers to the graph database of the EPF 102 to determine any related entry points. A query (in neo4j, called Cypher, for example) for entry points calling a specific subroutine object is:

```
MATCH (entry_point)-[*0..10]->(n)-[:PERFORMS]->(fixed_object)
WHERE fixed_object.type = 'subroutine' and fixed_object.name = 'object_1' and
(entry_point.type = 'transaction' or entry_point.type = 'report'
or entry_point.type = 'function' or entry_point.type = 'url')
RETURN entry_point.name, entry_point.type
```

This can be read as "find all the entry_points (objects of type transaction, report, function or url) that have a path (with 10 node steps maximum) that at the end PERFORMS the specific fixed_object object_1 of type subroutine".

A second example where the fixed object is a class method is:

```
MATCH (entry_point)-[*0..10]->(n)-[:CALLS]->(fixed_object)
WHERE fixed_object.type = 'subroutine' and fixed_object.name = 'object_2' and
(entry_point.type = 'transaction' or entry_point.type = 'report'
or entry_point.type = 'function' or entry_point.type = 'url')
RETURN entry_point.name, entry_point.type
```

This can be read as "find all the entry_points (objects of type transaction, report, function or url) that have a path (with 10 node steps maximum) that at the end CALLS the specific fixed_object object_2 of type class method".

At the end of this process, for each fixed object, the impact assessment system has a list of entry points that are impacted by that object. This list may look like this (Table 3):

TABLE 3

| Fixed Object | Affected Entry Point Type | Affected Entry Point Name |
| --- | --- | --- |
| object_1 | URL | url_1 |
| object_1 | Transaction | transaction_1 |
| object_1 | Transaction | transaction_2 |
| object_2 | Report | report_1 |
| object_2 | Function | function_1 |
| object_2 | Function | function_2 |
| object_2 | URL | url_2 |
| object_3 | Transaction | transaction_1 |
| object_3 | Function | function_3 |

Based on this list, the impact assessment system 1100 can get the first initial set of impacted objects that need to (or should) be tested after the patch implementation. This means that if a company implements the relevant patches, then the above listed entry points must (or should) be tested in order to ensure everything continues working as it should.

One of the functionalities described above involves the impact assessment system 1000 essentially learning the activities actually executed by users on the target system 1100 in a given period of time. This step is essentially about learning the operations that are executed by users in their daily work. Having the information about daily operations, the system 1000 will be able to determine, from the full (or filtered) list of entry points, which of the entry points are truly relevant to users' daily operations.

As mentioned above, the end-user of the impact assessment system typically specifies the relevant time period, which could be a day, a week, a month, a year, etc. For discussion purposes, let's assume that the specified time period is one month. In this exemplary implementation, if the SAP® system already has user activity information from the past month, the impact assessment system asks for all the events in the last month. Otherwise, the SAP® system starts recording at that time and continues to record for one month in order to get the desired user activity. In the case of an SAP® system, this impact assessment system 1000 is fed by two (or more) main logging features of the SAP® system: the security audit Log and the HTTP access log.

The security audit log typically records user logins, transactions started, reports executed, function calls, roles assignments, systems shutdown, audit changes, and so on. As mentioned above, the information from the security audit log that typically is most relevant to the impact assessment system 1000 includes: 1) Transaction &A Started, 2) Report &A Started, and 3) Successful RFC Call &C (Function Group=&A), where &A and &C are fields that can be replaced by the actual objects names, for example, Transaction SU01 started, Report RSUSR003 started, and Successful RFC Call RFC_READ_TABLE (Function Group=SDTX).

The HTTP access log records HTTP requests performed by end-users through a web browser. As mentioned above, the information recorded by the HTTP access log that typically is most relevant to the impact assessment system 1000 is the request to a url, for example: 192.168.100.25-user_1-[31/Oct/2002:10:46:34 +0200] "GET/catalog/index.html" 200 380.

During a month, these 4 types of events typically are recorded and stored into a database of events. After that, it is processed and the result is a table like the following (Table 4):

TABLE 4

| User | Type of Activity | Object executed |
|---|---|---|
| user_1 | Transaction | transaction_1 |
| user_1 | Report | report_1 |
| user_1 | Transaction | transaction_2 |
| user_2 | Transaction | transaction_3 |
| user_2 | Function | function_1 |
| user_2 | Function | function_2 |
| user_3 | Transaction | transaction_2 |

Here we have information that might, in a typical implementation, occupy the knowledge base of activity, which includes a full list of executions for all the users in a certain period of time.

From here, the impact assessment system typically derives information to prioritize or help prioritize objects or entry points that need to (or that should) be tested. In one exemplary implementation, this involves generating two types of outputs: 1) a list of relevant entry points to test after patch implementation, and 2) a list of users that may be affected by a failed patch implementation.

Having the information in the knowledge base of activity, the impact assessment system 1100 may, in some implementations, subtract from the full list of affected entry points, the ones that are not present in the user activity. The resulting list would represent a list of relevant entry points that need to be tested for that specific customer after the patch implementation. As result of a similar process, using the user activity, the impact assessment system 1000 can list the specific users of the target system that are using the relevant entry points.

In a typical implementation, this presents at least two major breakthroughs: 1) having a complete understanding of the impact of a patch implementation, giving the possibility to measure the risk exposure and giving more information to the user to better prioritize the patches, and/or 2) adding information about the real users who would be affected in case something goes wrong. This type of information is particularly valuable as it shows the administrator who is really being affected. Even if there are many relevant entry points to test, if, for example, some of the people involved (affected users) do not belong to or participate in a critical process of the company, there is a lower risk in not patching or not testing the patch after implementation. Or the opposite, if the affected users are part of a very critical process, then a failed patch would have a higher risk.

Going back to the full list of affected Entry Points, the impact assessment system, in the current example, had this (Table 3):

TABLE 3

| Fixed Object | Affected Entry Point Type | Affected Entry Point Name |
|---|---|---|
| object_1 | URL | url_1 |
| object_1 | Transaction | transaction_1 |
| object_1 | Transaction | transaction_2 |
| object_2 | Report | report_1 |
| object_2 | Function | function_1 |
| object_2 | Function | function_2 |

TABLE 3-continued

| Fixed Object | Affected Entry Point Type | Affected Entry Point Name |
|---|---|---|
| object_2 | URL | url_2 |
| object_3 | Transaction | transaction_1 |
| object_3 | Function | function_3 |

And, the knowledge base of activity had this (Table 1):

TABLE 1

| User | Type of Activity | Object executed |
|---|---|---|
| user_1 | Transaction | transaction_1 |
| user_1 | Report | report_1 |
| user_1 | Transaction | transaction_2 |
| user_2 | Transaction | transaction_3 |
| user_2 | Function | function_1 |
| user_2 | Function | function_2 |
| user_3 | Transaction | transaction_2 |

As result of the subtraction performed by the impact assessment system 1000 (e.g., by object_executed) of the second list from the first list, the system 1000 produces the following result (Table 5):

TABLE 5

| Fixed Object | Relevant Entry Point Type | Relevant Entry Point Name |
|---|---|---|
| object_1 | Transaction | transaction_1 |
| object_1 | Transaction | transaction_2 |
| object_2 | Report | report_1 |
| object_2 | Function | function_1 |
| object_2 | Function | function_2 |
| object_3 | Transaction | transaction_1 |

If the impact assessment system 1000 maps this list to the knowledge base of patches, in an exemplary implementation, this would produce (Table 6):

TABLE 6

| Patch ID | Fixed Object | Type of object | Relevant Entry Point | Entry Point Type |
|---|---|---|---|---|
| 1 | object_1 | Subroutine | transaction_1 | Transaction |
| 1 | object_1 | Subroutine | transaction_2 | Transaction |
| 2 | object_2 | Class Method | report_1 | Report |
| 2 | object_2 | Class Method | function_1 | Function |
| 2 | Object_2 | Class Method | function_2 | Function |
| 3 | object_2 | Class Method | report_1 | Report |
| 3 | object_2 | Class Method | function_1 | Function |
| 3 | object_2 | Class Method | function_2 | Function |
| 3 | object_3 | Function | transaction_1 | Transaction |

From the above list the system 1000 (or a system user) can determine, for example:

If Patch ID 1 is implemented, transaction_1 and transaction_2 must be tested.

If Patch ID 2 is implemented, report_1, function_1 and function_2 must be tested.

If Patch ID 3 is implemented, report_1, function_1, function_2 and transaction_1 must be tested.

If the system 1000 maps again this list to the user activity, the results can be extended to (Table 7):

TABLE 7

| Patch ID | Relevant Entry Point | Entry Point Type | Affected User |
|---|---|---|---|
| 1 | transaction_1 | Transaction | user_1 |
| 1 | transaction_2 | Transaction | user_2, user_3 |
| 2 | report_1 | Report | user_1 |
| 2 | function_1 | Function | user_2 |
| 2 | function_2 | Function | user_2 |
| 3 | report_1 | Report | user_1 |
| 3 | function_1 | Function | user_2 |
| 3 | function_2 | Function | user_2 |
| 3 | transaction_1 | Transaction | user_1 |

From the above list, the system 1000 (or a system user) can determine:

If Patch ID 1 is implemented and fails, user_1, user_2 and user_3 may be affected.

If Patch ID 2 is implemented and fails, user_1 and user_2 may be affected.

If Patch ID 3 is implemented and fails, user_1 and user_2 may be affected.

Automatic Detection of Unnecessary Privileges

Entry point finder (EPF) technology can be utilized or leveraged to help detect unnecessary privileges in a target computer system. In computer parlance, a privilege may be considered the capability of performing a certain activity by a given user.

Over time, in a company, large computer systems (e.g., SAP® systems), and the privileges associated therewith, can evolve considerably. For example, people may pass in and out of the company, the computer system and programs within the computer system may get fixed, patched and/or customized, and users, privileges, roles, etc. may be refined or otherwise changed. From a security standpoint, after some period of time a company may undertake a "profiles/roles re-engineering" or "permissions re-engineering" type project aimed at trying to ensure that profiles, roles, permissions or privileges are up-to date and aligned with the company's strategic intensions. Part of these projects may include analyzing whether there may be any unnecessary privileges in the system (e.g., privileges assigned to people, roles, profiles. etc. that are not necessary to support the company's strategic objectives). Such undertakings can be manually intensive, and may involve, for example, analyzing each user of the computer system, with in-person interviews to try to gain an understanding of the normal activities for each user on the system, and then just trying to figure out which assigned privileges may be unnecessary. Sometimes, after many months of work, a system administrator might be able to discard certain privileges that are no longer used and/or no longer required. This sort of process can sometimes help to limit some security vulnerabilities for the system, but, again, in very big companies with correspondingly big computer systems, it is not uncommon for this type of project to take several years or more and cost millions of dollars.

In certain implementations, the entry point finder (EPF) concepts disclosed herein can be applied or leveraged advantageously to help address these sorts of concerns by making it easier to detect unnecessary privileges in a target computer system (e.g., an SAP® system). In this regard, reference is made to FIG. 12, which is a schematic representation of an exemplary system 1200 that leverages the EPF concepts disclosed herein to help detect unnecessary privileges at a target computer system 1100 simply, quickly, reliably, and with relatively little effort required on the part of a system administrator. At a very high level, the system 1200, in a typical implementation, performs this functionality by identifying any of the privileges that are available at the target computer system 1100, but that have not been checked by the target system, for example, within a user-specified period of time. Once identified, these unnecessary privileges can be, and usually are, removed by the system administrator.

For some programs or systems, privileges may be assigned directly to users; for some programs or systems, privileges may be assigned to roles or profiles and the roles or profiles may be assigned to the users. These types of schemes are generally referred to as Role-Based Access Control (RBAC). The system 1200 and the associated techniques disclosed herein may apply to RBAC systems, and/or any other type of systems that involves privileges.

The system 1200 in FIG. 12, which has an EPF 102, is coupled to the target system 1100 and configured to detect/identify unnecessary privileges in the target system 1100.

In this regard, system 1200 includes a privilege extractor 1202 and a user activity extractor 1502, both of which are communicatively coupled to the target system 1100. The privilege extractor 1202 can be virtually any kind of data extractor configured to extract information about end user privileges in the target system 1200. Likewise, the user activity extractor 1502 can be virtually any kind of data extractor that is capable of extracting information about end user activities that are executed by end users on the target system 1100 (e.g., during a particular period of time).

The privileges extractor 1202 is communicatively coupled to a computer-based database (a knowledge base of privileges 1206). The knowledge base of privileges 1206 can be, for example, any kind of computer-based database that contains information about end user privileges on the system. Generally speaking, the knowledge base of privileges 1206 will include, or eventually be loaded with, a list that identifies all of the user privileges on or related to the target system 1100. In a typical implementation, the privileges extractor 1202 is configured to extract privilege information from the target system 1100 and store that extracted privilege information in the knowledge base of privileges 1206.

The user activity extractor 1502 is communicatively coupled to a computer-based database (the knowledge base of activity 1504). In a typical implementation, the user activity extractor 1502 is configured to extract user activity information from the target system 1100 and store that extracted user activity information in the knowledge base of activity 1504.

The entry points identifier 1208 and entry point finder 102 are communicatively coupled to the knowledge base of activity 1504, and are configured to identify privileges by entry point 1210, which is fed into a required privileges calculator 1212. The required privileges calculator 1212 is communicatively coupled to the knowledge base of privileges 1206 and to the EPF 102. The required privileges calculator 1212 is configured to identify any unnecessary privileges per user 1214.

In a typical implementation, the entry point identifier 1208 maps all the user activity to the actual entry points; not all the activity is strictly related to entry points. Then the identified entry points may be used as input for the EPF.

At a high level, the illustrated system 1200 is configured to identify any unnecessary privileges that have actually been checked by the target system during an end user-specified period of time. Once identified, these end points can be eliminated (e.g., by a system administrator) to enhance overall security of the target system 1100. In some implementations, the affected users (e.g., users that have been assigned the designed unnecessary privileges) may be identified as well. FIG. 13 is a flowchart that represents just such an exemplary process.

According to the illustrated process, a user of the system (e.g., a system administrator) specifies (at 1320) a period of time (e.g., a week, a month, a year, etc.) that the system 1200 should consider relevant for purposes of determining whether a particular privilege is necessary (e.g., being checked by the target system 1100) or not. In this regard, the system 1200 typically has a computer-based user interface terminal (not shown in FIG. 12) or the like, with a screen that enables or prompts the user to specify the desired period of time. The time period may be associated with virtually any length of time (e.g., a day, a week, a month, three months, a year, etc.) and may be entirely in the past, or extend into the future. In a typical implementation, the system 1200 is configured, so that whatever time period the end user specifies will be considered relevant by the system for purposes of determining whether a particular privilege is necessary (e.g., being checked by the target system 1100) or not. Generally speaking, of course, the longer the specified time period, the more likely the system 1200 will be to correctly determine whether a particular privilege is unnecessary or not. Conversely, the longer the specified time period, the longer the time needed for the system to execute its intended functionalities in this regard.

Next, according to the illustrated implementation, the system 1200 receives information about user activities on the target system 1200 during the user-specified time period. In this regard, the target system 1100 usually will have one or more logging features (e.g., security audit logs, audit trails, user activity logs, business transaction logs, HTTP access logs, etc.) to capture this kind of user activity information. If, for example, the end user has specified a time period of one month as being relevant to determining whether a particular privilege is necessary (e.g., being checked by the target system 1100) or not, and the target system 1100 already has collected one month worth of user activity information, then that information may be provided immediately to the system 1200 for processing. If, however, the target system 1100 has not already collected one month worth of user activity information, then, in that instance, the target system 1100 might then start (or continue) collecting user activity information until one month worth of that information can be provided to the system 1200 for processing.

If the target system 1100 is a typical SAP® system, then the user activity information may come from any one of (or both of) two (or more) possible sources: a security audit log for the target system 1100 and an HTTP access log for the target system 1100.

In a typical implementation, the security audit log will record a wide variety of different types of information (e.g., users logins, transactions started, reports executed, function calls, roles assignments, system shutdowns, audit changes, etc.). However, in a typical implementation, only some of those types of information may be considered relevant to determining whether a particular privilege is necessary (e.g., being checked by the target system 1100) or not. In one exemplary implementation, the only information recorded by a security audit log, for example, that is considered relevant to determining whether a particular privilege is necessary or not is information about: 1) transactions started, 2) reports started, and/or 3) successful function calls. The information about transactions started may take the form of Transaction &A Started; the information about reports started may take the form of Report &A Started; and the information about successful function calls may take the form of Successful RFC Call & C (Function Group=&A), where &A and &C are fields that may be replaced by actual object names. A specific example of these types of activities/events may look like this: 1) Transaction SU01 started, 2) Report RSUSR003 started, and/or 3) Successful RFC Call RFC_READ_TABLE (Function Group=SDTX).

In a typical implementation, the information recorded by an HTTP access log that is considered relevant to determining whether a particular privilege is necessary or not includes any HTTP requests performed by the end-users of the target system 1100 (e.g., through a web browser). These are essentially user-initiated requests to uniform resource locators (URLs), such as "192.168.100.25-user_1-[31/Oct/2002:10:46:34 +0200]" GET/catalog/index.html "200 380."

In an exemplary implementation, this information from the security audit log and the HTTP access log, for the specified period of time, is delivered (at 1322) to the system 1200 for processing. Generally speaking, this information (e.g., about transactions started, reports started, successful function calls, and URL requests) provides a fairly good indication of user activities on the target system 1100 over the user specified period of time. That is because, in many instances, user activities on the target system 1100 will involve a URL request, a transaction, a report or a function call.

In a typical implementation, once this information (about transactions started, reports started, successful function calls, and URL requests) is received by the system 1200, the information may be organized and stored in table-form, similar to Table 1, above. Table 1 identifies various users of a target system (e.g., 1100), the types of activities executed by those users on the target system, and any objects executed upon through the indicated activities. This information may be stored, for example, in the knowledge base of activity 1504.

Referring again to the flowchart of FIG. 13, for each user activity, the system 1200 (at 1324) queries the EPF 102 for information about any privileges associated that user activity. So, for example, the query might be to determine whether any privileges may have been checked when that user activity was performed. In a typical implementation, that sort of query can be readily answered utilizing the EPF 102, because, the EPF 102 generally will have mapped any privileges and/or privilege checks against any user activities during EPF set up. For each query, a response is returned (at 1326) that identifies any required (and checked) privileges associated with the corresponding activity. The system 1200 generally repeats this process (1324, 1326) until the system 1200 (at 1328) determines that there are any more user activities from the user-specified time period to consider. At that point, the system 1200 will have produced a list (1330) of privileges that actually have been used by target system users during the specified period of time.

Meanwhile, according to the illustrated implementation, the system 1200 requests (at 1332) an identification of all assigned privileges assigned to users at the target computer system 1100. A response to that request is provided (at 1334). Typically, the target computer system 1100 itself provides this information. This process produces a listing (1336) of all assigned privileges at the target computer system 1100.

Next, (at 1338) the system 1200 essentially subtracts (or removes) the privileges that were actually used by users on the target system 1100 during the specified time period from the listing of all assigned privileges at the target system 1100. The remaining privileges (i.e., those not removed)

essentially include only those that were not used (e.g., checked) during the specified time period. The system 1200, according to the represented implementation, designates those as unnecessary privileges (1340). Moreover, in some implementations, the system 1200 may also identify (e.g., to the system administrator) which users are assigned to the designated unnecessary privileges.

This information may be provided (e.g., at a computer-based user interface terminal) to a system administrator, for example, who can then (at 1342) remove the so designate unnecessary privileges.

A more specific example of some of the foregoing steps—involved in identifying unnecessary privileges and/or the impacted users in a target system—follows.

In this exemplary implementation, the system 1200 (at 1332, 1334, and 1336) may create a database with some (or all) of the information it receives from or about the target computer system 1200 (e.g., an SAP® system). This information may include, for example:

Full list of users, such as:

TABLE 8

| Users |
| --- |
| user_1 |
| user_2 |
| user_3 |

All roles/profiles assigned to the users, such as:

TABLE 9

| Users | Assigned Roles |
| --- | --- |
| user_1 | role_1 |
| user_1 | role_3 |
| user_2 | role_3 |
| user_3 | role_2 |
| user_3 | role_4 |

All privileges relating to the previous roles/profiles, such as:

TABLE 10

| Roles | Privileges |
| --- | --- |
| role_1 | priv_1 |
| role_1 | priv_2 |
| role_1 | priv_3 |
| role_2 | priv_2 |
| role_2 | priv_4 |
| role_3 | priv_5 |
| role_4 | priv_1 |
| role_4 | priv_3 |

Based on the foregoing information, the system 1200, in some implementations, may create and store another table (Table 11) that includes a full list of users for the target system mapped to their respective privileges (note: in an SAP® system, privileges are sometimes known as authorizations).

TABLE 11

| User | Priv | Assigned By Role |
| --- | --- | --- |
| user_1 | priv_1 | role_1 |
| user_1 | priv_2 | role_1 |
| user_1 | priv_3 | role_1 |

TABLE 11-continued

| User | Priv | Assigned By Role |
| --- | --- | --- |
| user_1 | priv_5 | role_3 |
| user_2 | priv_5 | role_3 |
| user_3 | priv_2 | role_2 |
| user_3 | priv_4 | role_4 |
| user_3 | priv_1 | role_4 |
| user_3 | priv_3 | role_4 |

Any, or all, of this information may be stored, for example, in the knowledge base of privileges 1206, and essentially amounts to a full identification user privileges for the target system 1100.

Next, an example of 1322, 1324, 1326, 1328, and 1330 is provided. For each user activity (e.g., corresponding to an end point in the corresponding graph database) executed on the target system 1100, the system 1200 asks its EPF 102 (using, e.g., a graph database neo4j, loaded) for checked privileges related to the entry points. For example, for the entry point of type transaction: transaction_1, find all the privileges that are some point would be checked. In the neo4j query language (called 'Cypher'), that query may be written like this:

MATCH (entry_point)-[*0..10]->(n)-[:CHECKS]->(privilege)
WHERE entry_point.name = 'transaction_1' and entry_point.type = 'Transaction'
RETURN entry_point, privilege This can be read as "from an entry_point (of type transaction) called transaction_1, find all the paths (with 10 node steps maximum) that at the end check a privilege and return the entry_point name and the checked privilege." The number of steps can be modified (e.g., by a user or automatically) according to the requirements; generally speaking, the bigger the number is, the slower is the process. At the end of this process, the system 1200 would have a new result: a list of required privileges (Table 12).

TABLE 12

| Entry Point | Checked Privilege |
| --- | --- |
| transaction_1 | priv_1 |
| transaction_1 | priv_3 |
| report_1 | priv_5 |
| function_1 | priv_5 |
| function_2 | — |
| transaction_2 | priv_1 |
| transaction_2 | priv_4 |
| transaction_3 | priv_3 |

Now that the system 1200 has all this information, the system 1200 (e.g., at 1338) reviews each user activity (e.g., based on information from the knowledge base of activity 1504) and validates which privileges were actually checked and which are unnecessary. In other words, in a typical implementation, the system 1200 subtracts the set of checked privileges for a certain user from the set of privileges assigned to that user. As result, the system identifies a new set of privileges that are essentially unnecessary, since they were not checked by any operation of the user.

In one exemplary implementation, the system 1200 may expand the information previously in the knowledge base of activity to add any checked privileges. This may produce the following (Table 14):

TABLE 14

| User | Type of Activity | Object executed | Checked privilege |
|---|---|---|---|
| user_1 | Transaction | transaction_1 | priv_1, priv_3 |
| user_1 | Report | report_1 | priv_5 |
| user_2 | Transaction | transaction_3 | priv_3 |
| user_2 | Function | function_1 | priv_5 |
| user_2 | Function | function_2 | — |
| user_3 | Transaction | transaction_2 | priv_1, priv_4 |

Next, the system 1200 (at 1326) creates a new set of elements: users and their checked privileges. This is represented in Table 15.

TABLE 15

| User | Checked privilege |
|---|---|
| user_1 | priv_1 |
| user_1 | priv_3 |
| user_1 | priv_5 |
| user_2 | priv_3 |
| user_2 | priv_5 |
| user_3 | priv_1 |
| user_3 | priv_4 |

Next, the system 1200 (at 1328) subtracts this new set from the knowledge base of privileges to produce Table 16:

TABLE 16

| User | Priv | Assigned By Role |
|---|---|---|
| user_1 | priv_3 | role_1 |
| user_3 | priv_2 | role_2 |
| user_3 | priv_3 | role_4 |

Then, the system 1200 is able to provide (e.g., on a display at a computer-based user interface terminal) the following information (1340), which a system administrator tasked with managing privileges would likely find very useful:

You can safely remove the priv_3 from user_1 which is assigned through role_1

You can safely remove the priv_2 from user_3 which is assigned through role_2

You can safely remove the priv_3 from user_3 which is assigned through role_4

In this scenario the system administrator, for example, can simply remove 1330 these privilege(s) from the related role(s). However, there may be some scenarios where that same role is assigned to a second user (or multiple users), and that user (those users) may need to maintain the privilege. In that case, the system 1200 will warn the system administrator that if the privilege is removed from the role, another user may be affected (and undesirably so), so it suggests to create a new role with lower privileges for the original user instead of just removing the privilege.

It can be quite advantageous to leverage EPF technology to facilitate identifying unnecessary privileges in a target system. This is at least in part because the EPF technologies maps privileges and/or privilege checks of the target computer system 1100 to user activities on the target system 110. In advanced business application programming (ABAP), for example, a privilege or privilege check may be represented in source code, which is, therefore, readily transferred by the EPF technology into a node-connector style graphical representation, making it easy to identify privileges and privilege checks and how they interact with or relate to various user activities.

Moreover, as the system 1200 has access to user activity information, given a particular user action, it is very easy for the system 1200, leveraging EPF technology, to find paths, for example, to specific privileges checks. And, if the system 1200 has information about all of the activities by end users on the target system 1100, for each activity, the system 1200 can map that activity to any privileges that were checked. From this, as discussed above, the system 1200 can easily predict which assigned privileges were never used. This information, if readily available, would enable a system administrator, for example, to deactivate certain unused privileges, thereby enhancing overall system security, without significant risk of accidentally eliminating a needed privilege.

Generally speaking, the system 1200, with the EPF technology, represents a tool that may be used over and over again over time, as users change their behavior, roles, and privileges. This tool can help administrators to constantly monitor a wide role space and to avoid having to working on huge, difficult-to-manage projects to deal with wide role space issues.

Automatic Detection Rules Generation Based on Vulnerabilities Primitives

Entry point finder (EPF) technology can be utilized and/or leveraged to help generate automatic detection rules for security vulnerabilities at a target computer system (e.g., an SAP® system). In a typical implementation, a detection rule essentially defines a set of conditions that once satisfied may result in or cause an alert being triggered. One example of a detection rule, which of course could be expressed in virtually any kind of computer language, is this:

If a packet of network information contains the string "ransomware," then trigger an alert.

At a high level, generating this kind of detection rule generally entails: identifying a vulnerability, analyzing that vulnerability to try to understand key things that could be used to detect an exploitation of the vulnerability, and taking those key things into account when trying to write the detection rule (in an appropriate language, of course). In a complex system or where the vulnerability is associated with an object that is hidden from straightforward observation, this process can be daunting.

FIG. 14 is a schematic representation of an exemplary detection rule generating system 1400 that includes an entry point finder (EPF) 102 and is configured to automatically generate detection rules for one or more security vulnerabilities in the target computer system 1100 based on vulnerability primitives.

Notably, in a typical implementation, the EPF 102 (and perhaps other components of the detection rule generating system 1400) is run directly on the target computer system 1100. This helps ensure that the EPF 102 can be (and is) loaded up—prior to helping generate the detection rules—with the source code that it will need to effectively perform that functionality—i.e., the actual source code of the target system 1100, taking into account any customizations including any particular, special, or strange solutions, products, or versions that may have been installed at the target computer system 1100.

Beyond the EPF 102, the detection rule generating system 1400 includes a knowledge base of vulnerability primitives 1402, an affected entry point finder 1404, a detection rules generator 1406, and a knowledge base of detection rules 1408. Also, in some implementations, such as the illustrated implementation, the system 102 has a missing patches detector 1410 (that may be provided by a third party).

FIG. 15 is a flowchart of an exemplary process that may be performed by or in conjunction with the system 1400 of FIG. 14.

The illustrated process starts (at 1552) by running the EPF 102 at the target computer system 1100 so that the EPF will have access to (and become loaded with) all of the source code from the target computer system 1100. Thus, even if the target system 1100 has been customized (e.g., with particular, special, or strange solutions, products, or versions), the EPF 102, when loaded with source code, will be properly configured and adapted to provide its intended functionalities with respect to that specific target system 1100.

Ensuring that the EPF 102, when loaded with source code, will be properly configured and adapted to provide its intended functionalities with respect to that specific target system 1100 is important for several reasons.

First, suppose, for example, that the target system 1100 has a new SAP® solution called "SAP Integration Tool" which has a report R that calls object A. If the EPF 102 does not have access to and does not get loaded with the source code for this new solution, then the graphical-style database of the EPF 102 will not show any relationships between report R and object A. Moreover, report R may not even exist as a node in the graphical-style database of the EPF 102. So, it would not be possible utilizing the techniques disclosed herein to create a detection rule in that case that relates to report R, object A and/or the relationship therebetween. Therefore a company that has installed the new solution won't get any protection against the evil usage of report R.

One possible solution to this issue could be using all the existing code as input. However, this is technically impossible. Not only because there exist a virtually uncountable number of solutions and components in the universe, but also because multiple versions of solutions and components exist. Even if the EPF 102 could get all this code, there are still products that may be difficult to access from a practical perspective because of license issues and the like. For example, one might not have access to the code that handles the sales processes of Chinese companies and would need to buy it.

The use of custom source code is another concern. Sometimes, larger companies, in particular, will develop their own source code, because they either have to or want to customize their own processes. This kind of code will never be published, therefore, a third party providing the EPF functionality would not be able to easily access those changes.

Next (at 1554), according to the illustrated implementation, the EPF extracts all of the source code (including all objects, etc.) on-demand from the target computer system 1100, stores the extracted source code in a search platform, finds relationships among the represented objects, and a creates a graphical-style database that represents objects as nodes and relationships between objects as connectors between the nodes.

Next (at 1556), the illustrated process includes identifying vulnerability primitive(s) for any security vulnerabilities. A vulnerability may be considered a bug or feature of the target system 1100 that exposes it to possible attack, or a flaw in the target system's security. A vulnerability primitive may be considered a simple statement or indication that a particular object, for example, is vulnerable. One example of vulnerability primitive in this regard would be: "Object X is vulnerable," where X describes or identifies the vulnerable object.

Vulnerabilities, or vulnerability primitives, can be identified to the system 1400 in any one of a variety of possible ways. For example, in some implementations, vulnerabilities may be identified by virtue of a system administrator entering information about the vulnerability or by entering the vulnerability primitive into the system 1400 via a computer-based user interface terminal. As another example, the vulnerability may be reported to the company or directly into the system 1400 by a research lab, such as the research lab at the Onapsis® company, or may be identified by virtue of a release by the SAP® company on a Monthly Patch Day for example. In some such implementations (e.g., if the information is arriving from the research lab at the Onapsis® company, then a member of the research lab may already have completed an analysis to identify what kinds of "key things" might be relied upon or utilized to generate a detection rule for any associated security vulnerabilities.

In a typical implementation, the information about the vulnerabilities and/or the vulnerability primitives may be stored in a computer-based database, such as the knowledge base of vulnerabilities primitives 1402 in FIG. 14.

Often, a vulnerability might reside in or relate to an object whose execution cannot readily and directly be detected by logs, network sniffing, or any other source or auditing. For purposes of discussion, let's say that object A in the target system 1400 cannot be readily and directly detected. It is quite common that another object (e.g., a function F), which might be detectable, calls or uses this object A. Therefore, if the execution of function F can be detected (e.g., if it is a function performed by a user or in direct response to a user action), then a detection rule for object A might reference detecting the execution of function F rather than detecting execution of object A. Accordingly, in a typical implementation, one particular vulnerability (in an undetectable, or difficult to directly detect object) may warrant writing n detection rules (where n is any number greater than zero). A concrete example might where multiple functions ($F_1$, $F_2$, ... $F_n$) all call the same object A.

In a typical implementation, the EPF 102 can be used or leveraged to help identify any relationship (or connections) between a vulnerable, but undetectable or difficult to detect, object in the target system 1400 and any other related, but easier to detect, objects (e.g., functions that call the undetectable or difficult to detect object). Referring again to FIG. 15, in this regard, the illustrated process includes (at 1558) correlating the vulnerability primitive(s) against information represented in EPF graphical-style database. In a particular implementation, this might include utilizing the EPF and its graphical-style information to identify the fact that the multiple functions ($F_1$, $F_2$, ... $F_n$), mentioned above, all call the same object A. This step (i.e., correlating the vulnerability primitive(s) against information represented in EPF graphical-style database) may be performed, for example, either by or in association with the affected entry point finder 1404.

Next (at 1560), the illustrated process includes generating one or more detection rule(s) based on the results of the correlation. So, for example, if the correlation reveals that the multiple functions ($F_1$, $F_2$, ... $F_n$), mentioned above, all call the same object A, then the system 1400 may generate a vulnerability detection rule (that corresponds to the vulnerability primitive, "object A is vulnerable") along the following lines:

If any one of functions ($F_1$, $F_2$, ... $F_n$) are performed, then trigger an alert.

In some implementations, the alert might also identify that object A has been rendered vulnerable.

The foregoing techniques for automatically generating detection rules for security vulnerabilities, including running the EPF 102 on the target system itself, are advantageous for a number of reasons. For example, by following these techniques, a company will only have the detection rules it needs for its target system. There won't be any unnecessary rules (e.g., that relate to systems, products or versions thereof not in use at the target system). Moreover, a company will have rules that relate to any company customizations, as well as any products that might otherwise be difficult to obtain.

As mentioned above, a vulnerability primitive may be considered a simple statement or indication that a particular object, for example, is vulnerable. Moreover, in some implementations, a vulnerability primitive may be considered as the raw material that facilitates the processes disclosed herein to produce detection rule(s) for the corresponding vulnerability. In various implementations, these processes can be relatively simple or quite complex, depending on the vulnerability primitive and its context with the overall target system. For example, the vulnerability primitive, "Object X is vulnerable," may produce a single detection rule ("if object X is executed, then do Y"), or may produce multiple different detections (e.g., if the execution of object X is impossible or very difficult to directly detect), such as "if any one of functions (F1, F2, . . . Fn) is executed, then do Y," where the functions (F1, F2, . . . Fn) are related to object Y (and, therefore, represented as nodes connected to the object Y node in the EPF graphical-style database). The complexity of a process for a particular vulnerability primitive may depend, for example, on: whether the company, in fact, has the corresponding object in one or more of their system components, and whether this is an object that is used or widely used by other kinds of objects in the target system.

In a typical implementation, the EPF 102 (and some or all of the other components of the system 1400) may be provided to a company for installation directly into its target system 1400. The EPF 102 and overall system 1400 adapts to whatever system exists where it is installed.

What follows is a relatively high level summary of one implementation of the relevant techniques for generating detection rules for security vulnerabilities based on vulnerability primitives, followed by a specific example of same. At a high level, this exemplary implementation includes extraction of source code with an EPF (at the client/company-side), shipment or transfer of knowledge base of vulnerability primitives (VPs) (KBVPs), correlation between extracted code and the KBVPs, detection Rule generation based on output of correlation, (optionally) utilizing a 3$^{rd}$ party missing patches detector, and generating a set of rules into a knowledge base of detection rules (KBDR).

Extraction of Source Code with EPF (Client-Side)

In a typical implementation, the extraction process will lead to an output that will include the graph database mentioned herein which will be able to be queried in order to get useful information regarding relationships among objects. Again, in a typical implementation, the EPF will be run directly on the client side (i.e., at or as part of the target system itself), so that the system will be able to analyze not only standard and well-known code but also any custom and/or exclusively licensed code, for example, that may be difficult to gain access to.

Shipment of "Knowledge Base of VP's" (KBVP's)

In certain implementations, each time a new vulnerability is analyzed, for example, by a research team, potentially N (any number) new vulnerability primitives (VPs) will be created. These new VPs may be added to (and collected as part of) a knowledge base which will be later shipped to the company that owns and utilizes the target system. Even though, in a typical implementation, all clients (companies) may have the same KBVP's the final set of rules may vary from company to company depending, at least in part, on the systems installed at each company's system.

Correlation Between Extracted Code and the KBVP's

In certain implementations, this part of the process combines/correlates the VPs saved inside the KBVP with information from the EPF graph database extracted from the client's systems. As a practical example, let's imagine that we have the following KBVP:

| | Knowledge Base Vulnerability Primitives |
|---|---|
| # 1 | {"name": "A", "type": "report"} |
| # 2 | {"name": "A", "type": "include"} |
| # 3 | {"name": "B", "type": "function"} |

Generally speaking, types Report and Function are directly callable, therefore they can be considered entry points. Include cannot be called. Let's also assume that object A (Report) uses A (Include). Further, let's assume that there are two clients, therefore, in a typical implementation, there will be two EPF graph databases.

The system will be generally charged with reading each VP, and creating a corresponding query to the graph database in order to get all the requirements to create the rules. Let's imagine that one client has objects affected in VP's #1 and #2 and the other one has objects affected by #2 and #3.

| Clients | Objects installed |
|---|---|
| #1 | A (Report), A (Include), more |
| #2 | A (Include), B (Function), more |

In an exemplary implementation, the system, based on the VP's, will start querying the graph database in order to get information related with the affected objects. For instance, for the #2, the system might generate something like:

"Return all the objects that are Entry Points that at some point use/call object A (include)"

The other queries will be the same or will have very small changes

In this case, the system can ensure that both results are going to be different. No matter how many others objects call/use A (include), due client #2 hasn't the object A(report) it won't appear in their result:

| Clients | Results of query for VP's #2 |
|---|---|
| #1 | A (Report), . . . |
| #2 | . . . |

After executing the 3 queries, something like this will be the final output:

| Clients | Results of query for VP's #2 |
|---|---|
| #1 | A (Report), . . . |
| #2 | B (Report), . . . |

This means that besides other objects that can be implemented in the company's components, detection rule affecting A (Report) for client #2 and B (Function) for client #1 won't be generated.

The output of this step will be all the necessary information to create the rules for this vulnerable objects.

Detection Rule Generation Based on Output of Correlation

Once we have the output of which rules to generate, the system reads the output and generates the rule for each object on it. In some implementations, the company will have been provided with templates of detection rules that will be fed by the output identifying which rules to generate (for which vulnerable objects).

(Optional) $3^{rd}$ Party Missing Patches Detector

In some implementations, the system may use a missing patches detector to reduce the number of generated detection rules. For example, a system administrator, for example, may think that if they have patched a certain vulnerability, it does not make sense to have a detection rule for the vulnerability. Therefore, having the list of missing patches, the system can generate the detection rules only for those given patches. Otherwise, the system can generate detection rules for all the vulnerabilities, regardless if they were patched or not.

Set of Rules (KBDR)

At the end of the process, the KBDR is ready to be used. Once system filtered the rules generated (in an earlier step, discussed herein), the system (and/or the company) will be ready to deploy the detection rules in a product (that consumes these rules) and start using them.

In some implementations, the processes disclosed herein may advantageously: customize detection rules per client (company), provide for the shipment of 'raw material' instead of full detection rules to the company, and provide a highly accurate rules knowledge base.

A number of embodiments of the invention(s) have been described. Nevertheless, it will be understood that various modifications may be made without departing from the spirit and scope of the invention.

For example, in various embodiments, the subject matter disclosed herein can be implemented in digital electronic circuitry, or in computer-based software, firmware, or hardware, including the structures disclosed or suggested in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

Additionally, although some of the explanations provided herein were done taking into account one SAP system at the time, in some implementations, the EPF may be configured to process more than one SAP (or other) system at the same time. In those instances, the only thing that will most likely need to change is the size of the list extracted by the Leader.

In various implementations, the worker modules, such as Leader, ExtractorG, Extractors, Decompressors, SOLR Uploaders/Downloaders, Analyzers, Graph preprocessors and CSVCreaetors, may be configured to run completely distributed and therefore achieve a very scalable architecture. Moreover, in various implementations, one or more of the worker modules may be implemented in software, hardware and/or as a software module being executed on a hardware platform.

The processes, functionalities and technologies disclosed herein may be applied to other types of software systems based on other languages, such as JAVA, .NET, C, C++, Python, Perl, etc. The specific object definitions may be based, in part at least, on the type of language and/or the needs of the user. For example, high levels of abstractions can be used to represent an entire module of an application and lower levels of abstraction could be used to represent specific functions, critical lines of code, or specific objects of the language, allowing the user to find the relationships among all of them.

The database (e.g., the graph database) can be virtually any kind of graph database. The underlying storage mechanism of graph database can vary. Some implementations, for example, may depend on a relational engine and store the graph data in a table. Other implementations, for example, may use a key-value store or a document-oriented database, making them inherently NoSQL structures. In some implementations, the graph database may be based on non-relational storage engine technology that also includes the concept of tags or properties, which are essentially relationships lacking a pointer to another document. This may allow objects and/or their relationships to be categorized for easy retrieval en masse.

Retrieving data from a graph database generally requires a query language other than SQL. Some possibilities in this regard might include query languages such as Gremlin, SPARQL, and Cypher. In addition to having a query language interface, in some implementations, the graph database may be accessed through an application programming interface (API).

All queue names, worker module names, etc. used herein are arbitrary and should not be used, unless otherwise indicated, to restrict the scope of this application.

Multiple different computer-based memory storages are mentioned herein. Of course, in various implementations, there may be fewer (or more) discrete computer-based memory storages utilized to implement the functionalities disclosed herein. Moreover, multiple different queues are described herein. Again, of course, in various implementations, there may be fewer (or more) discrete queues utilized to implement the functionalities disclosed herein. Similarly, multiple different worker modules are disclosed herein. In some implementations, of course, the functionalities of several worker modules may be combined into one worker module. Alternatively, in some implementations, the functionalities of a single worker module may be distributed across more than one worker module. Of course, in some implementations, additional functionalities (and associated worker modules) may be added to the functionalities described herein. Likewise, in some implementations, some of the functionalities (and associated worker modules) may be dispensed with.

The operations described in this specification can be implemented as operations performed by one or more data processing apparatuses (e.g., computer-based processors) on data stored on one or more computer-readable storage devices or received from other sources. The term "processor" encompasses all kinds of, and any number of, apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and described herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, some of the concepts disclosed herein can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The functionalities associated with the system disclosed herein can be accessed from virtually any kind of electronic computer device, including, for example, computers of all kinds, cell phones and tablets.

The memory storage media mentioned herein can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In a typical implementation, the EPF may include or be coupled to a computer-based user access terminal that enables a user to access or view information about the objects and/or their respective relationships. In some implementations, this viewable access may include access to a graphical representation of the objects and/or their respective relationships, similar to what is shown, for example, in FIG. 9 (or similar to some portion of what is shown in FIG. 9). In various implementations, the underlying information (e.g., about each node and about each relationship) may be included in the graphical presentation (e.g., with labels, color-coding, different dash-types for lines, associated textual descriptions, etc.).

The systems and techniques disclosed herein may be used with the Advanced Business Application Programming (ABAP), but they, of course, can be expanded to any language to model its abstract structures (generally not single statements) and the behavior of the system based on how its internal objects interact with each other.

The phrase computer-readable medium or computer-readable storage medium is intended to include at least all mediums that are eligible for patent protection (e.g., in the United States, under 35 U.S.C. § 101), and, in some instances, to specifically exclude all mediums that are non-statutory in nature to the extent that the exclusion is necessary for a claim that includes the computer-readable (storage) medium to be valid. Some or all of these computer-readable storage media can be non-transitory.

Other implementations are within the scope of the claims.

What is claimed is:

1. A computer-based method of analyzing a business-critical application computer system to find relationships among software objects associated with the business-critical application computer system, the method comprising:

extracting a plurality of software objects from the business-critical application computer system;

storing the extracted software objects in a computer-based search platform;

finding relationships between the extracted software objects that are stored in the computer-based search platform;

creating a database that represents the extracted software objects and the relationships between the extracted software objects;

producing a graphical user interface for the created database that displays each respective of the extracted software objects as a single node and displays one or more of the relationships as one or more connectors between the nodes that correspond to the related software objects;

identifying a plurality of entry points based on the database or the graphical user interface, wherein each of the entry points comprises one of the extracted software objects or one of the relationships that can be accessed by an end user, wherein the extracted software objects and the relationships that cannot be accessed by the end user are not identified as an entry point;

receiving, from the end user, a specified period of time for the analyzing that is prompted in the graphical user interface for selection by the end user;

receiving end user activities over the specified period of time, wherein the identifying of the entry points is over the specified period of time;

cross-referencing the end user activities against the identified entry points to further identify any of the entry points being modified and being used as part of the end user activities during the specified period of time; and determining vulnerabilities based on the cross-referencing, wherein the determined vulnerabilities are the identified entry points being modified and being used as part of the end user activities during the specified period of time.

2. The computer-based method of claim 1, wherein the software objects are elements of the business-critical application computer system whose graphical representation as nodes connected to one another based on relationships between the corresponding elements is based on a particular goal of the analysis, further wherein each respective one of the elements of the business-critical application computer system is a unique piece of code, a software file, or other aspect of the business-critical application computer system.

3. The computer-based method of claim 1, further comprising:
producing a list of functions impacted by the determined vulnerability;
producing a list of end users that are using the functions;
determining which functions were not used.

4. The computer-based method of claim 1, wherein the modification comprises a patch that modifies one or more of the software objects.

5. The computer-based method of claim 1, wherein some of the software objects include source code from the business-critical application computer system, and other some of the software objects do not include source code from the business-critical application computer system.

6. The computer-based method of claim 5, wherein the extracting of the software objects that include source code comprises:
querying the business-critical application computer system for names of packages associated with the business-critical application computer system;
receiving a list of package names associated with the business-critical application computer system in response to the query; and
storing the list of package names in a first queue.

7. The computer-based method of claim 6, wherein extracting the software objects that include source code further comprises:
selecting one package name from the first queue;
extracting, with a particular one of a plurality of extractors, the source code associated with the selected package name from the business-critical application computer system.

8. The computer-based method of claim 7, further comprising:
saving a compressed version of the extracted source code at a first computer-based memory location; and
pushing the location of the stored compressed version of the extracted source code to a second queue.

9. The computer-based method of claim 7, further comprising:
saving a decompressed version of the extracted source code at a second computer-based memory location; and
pushing the location of the stored decompressed version of the extracted source code to a third queue.

10. The computer-based method of claim 5, wherein extracting the software objects that do not include source code comprises:
pushing the software objects that do not include source code to queues, each of which is for a particular type of software object that does not include source code.

11. The computer-based method of claim 1, wherein storing the extracted software objects in a computer-based search platform comprises:
reading, with one or more search platform uploaders, source code from a computer-based memory storage, based on the location information in a queue,
reading, with the one or more search platform uploaders, non-source code-based objects from one or more software object queues; and
storing what the one or more search platform uploaders read into the search platform with an intelligent structure.

12. The computer-based method of claim 1, wherein finding relationships between the extracted software objects that are stored in the computer-based search platform comprises:
for software objects that have source code:
reading each statement of the source code; and
determining whether any statements in the source code define a relationship between any of the software objects; and
for software objects that do not have source code:
executing one or more queries regarding possible relationships between any of the software objects.

13. The computer-based method of claim 1, wherein the graphical user interface is the database created and comprises a graph database to facilitate visualization of the software objects of the business-critical application computer system and their respective relationships to one another.

14. An entry point finder (EPF) comprising:
a plurality of worker modules;
a plurality of queues, wherein each one of the queues is communicatively coupled to a corresponding one or more of the worker modules;
a plurality of computer-based memory storage locations, wherein each one of the computer-based memory storage locations is communicatively coupled to a corresponding one or more of the worker modules; and
a computer-based search platform communicatively coupled to at least one of the worker modules, wherein the entry point finder is configured to:
extract, with execution of one or more of the worker modules, a plurality of software objects from a business-critical application computer system;
store the extracted software objects in the computer-based search platform;
find relationships, with execution of one or more of the worker modules, between the extracted software objects that are stored in the computer-based search platform;
create a database that represents the extracted software objects and the relationships between the extracted software objects; and identify an entry point that is at least one of the extracted software objects or at least one of the relationships which an end user can execute;

receive, from the end user through a graphical user interface, a specified period of time for analyzing;

extract end user activities executed by the identified entry point over the specified period of time, wherein the identifying of the entry point is over the specified period of time;

cross-referencing the end user activities against the identified entry point to further identify any entry point being modified and being used as part of the end user activities during the specified period of time; and determine vulnerabilities based on the cross-referencing, wherein the determined vulnerabilities are any of the identified entry point being modified and being used as part of the end user activity during the specified period of time.

15. The entry point finder claim 14, wherein the entry point finder is configured to display each respective of the extracted software objects as a single node and display one or more of the relationships as one or more connectors between the nodes that correspond to the related software objects, wherein the software objects are elements of the business-critical application computer system whose graphical representation as the nodes connected to one another based on the relationships between the corresponding elements is based on a particular goal of the analysis.

16. The entry point finder of claim 15, wherein each respective one of the elements of the business-critical application computer system is a unique piece of code, a software file, or other aspect of the business-critical application computer system.

17. The entry point finder of claim 15, wherein the database is configured to facilitate a graphical display that shows:

each respective software object as a single node in the graph database; and one or more relationships between the software objects by one or more connectors between the nodes that correspond to the related software objects.

18. The entry point finder of claim 14, wherein the entry point finder is further configured to determine a vulnerability based on the end user activity.

* * * * *